(12) United States Patent
Mikami et al.

(10) Patent No.: US 6,393,194 B1
(45) Date of Patent: May 21, 2002

(54) MAGNETIC RECORDING AND REPRODUCING VIDEO SIGNAL IN MAGNETIC TAPE AT VIDEO QUALITY SELECTABLE FROM PRESCRIBED DIFFERENT QUALITIES

(75) Inventors: Seiichi Mikami, Yokohama; Yasutoshi Matsuo, Atsugi, both of (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/170,043

(22) Filed: Oct. 13, 1998

(30) Foreign Application Priority Data

Oct. 16, 1997 (JP) .............................. 9-299358
Jan. 30, 1998 (JP) ............................. 10-033657

(51) Int. Cl.⁷ ........................... H04N 5/91; H04N 7/00; H04N 9/79; H04N 5/268; G11B 15/12
(52) U.S. Cl. ..................... 386/46; 386/35; 348/705
(58) Field of Search ................. 386/1, 35, 37, 386/46, 123; 360/60, 61–64; 348/705

(56) References Cited

U.S. PATENT DOCUMENTS

| | | | | |
|---|---|---|---|---|
| 3,852,808 A | * | 12/1974 | Sadashige | 386/10 |
| 4,811,122 A | * | 3/1989 | Kido et al. | 360/25 |
| 5,126,908 A | * | 6/1992 | Casari et al. | 360/137 |
| 5,299,002 A | * | 3/1994 | Funayama | 386/25 |
| 5,448,369 A | * | 9/1995 | Lee et al. | 386/123 |
| 5,491,561 A | * | 2/1996 | Fukuda | 386/123 |
| 5,532,831 A | * | 7/1996 | Choi et al. | 386/123 |
| 5,561,530 A | * | 10/1996 | Kanazawa | 386/46 |
| 5,740,309 A | * | 4/1998 | Mimura | 386/93 |
| 6,101,312 A | * | 8/2000 | Funayama | 386/83 |
| 6,104,865 A | * | 8/2000 | Hamaguchi et al. | 386/123 |

FOREIGN PATENT DOCUMENTS

| | | | |
|---|---|---|---|
| JP | 8-22655 | * | 1/1996 |
| JP | 8-96305 | * | 4/1996 |

* cited by examiner

Primary Examiner—Andrew B. Christensen
Assistant Examiner—Polin Chieu
(74) Attorney, Agent, or Firm—Louis Woo

(57) ABSTRACT

In a magnetic recording and reproducing apparatus, a video signal of a high-quality format which has a first given frequency band is recorded on a standard magnetic tape designed to record a video signal of a standard format having a second given frequency band narrower than the first given frequency band. In the magnetic recording and reproducing apparatus, a video signal of the high-quality format is reproduced from a standard magnetic tape.

9 Claims, 11 Drawing Sheets

MAGNETIC RECORDING AND REPRODUCING VIDEO SIGNAL IN MAGNETIC TAPE AT VIDEO QUALITY SELECTABLE FROM PRESCRIBED DIFFERENT QUALITIES

BACKGROUND OF THE INVENTION

1. Field of the Invention

This invention relates to an apparatus for recording and reproducing a video signal on and from a magnetic tape.

2. Description of the Related Art

Some video tape recorders (VTR's) are based on a standard format referred to as a VHS format. There is an S-VHS format which improves over the VHS format. A VTR of the S-VHS standard can record and reproduce a video signal which is wider in frequency band and higher in picture quality than a video signal handled by a VTR of the VHS standard.

The VTR of the S-VHS standard uses an exclusive magnetic tape referred to as an S-VHS tape. The S-VHS tape is designed to more suit with a video signal having a wide frequency band and short wavelengths in comparison with a VHS tape.

In the VTR of the VHS standard, a video signal to be recorded is separated into luminance and chrominance signals. The luminance signal is converted or modulated into an FM modulated luminance signal having a frequency deviation of 3.4 to 4.4 MHz.

The chrominance signals are down-converted into a low frequency band around 629 kHz. The FM modulated luminance signal and the frequency-down-converted chrominance signals are combined before being recorded on a VHS tape.

In the VTR of the S-VHS standard, a video signal to be recorded is separated into luminance and chrominance signals. The luminance signal is converted into an FM modulated luminance signal having a frequency deviation of 5.4 to 7.0 MHz. The chrominance signals are down-converted into a low frequency band around 629 kHz. The FM modulated luminance signal and the frequency-down-converted chrominance signals are combined before being recorded on an S-VHS tape.

The VTR of the VHS standard can use an S-VHS tape instead of a VHS tape. In general, the VTR of the S-VHS standard can operate in each of two different modes, a VHS mode and an S-VHS mode. During the VHS mode of operation of the S-VHS VTR, a video signal of the VHS format is recorded on a VHS tape or an S-VHS tape. During the S-VHS mode of operation of the S-VHS VTR, a video signal of the S-VHS format is recorded on an S-VHS tape.

In general, an S-VHS tape is contained in a cassette having an identification hole which indicates that the tape therein is of the S-VHS type. The VTR of the S-VHS standard has a function of sensing an identification hole in a tape cassette placed therein. When the S-VHS VTR senses an identification hole in a tape cassette, the S-VHS mode of operation is automatically started. On the other hand, when the S-VHS VTR fails to sense an identification hole in a tape cassette, the VHS mode of operation is started.

An advanced VTR detects characteristics of a used magnetic tape, and records a video signal on the magnetic tape under recording conditions (that is, the VHS mode or the S-VHS mode) determined in response to the detected tape characteristics. The advanced VTR can optimize signal recording tape by tape.

Specifically, the advanced VTR implements a preliminary process before the recording of a video signal. During the preliminary process, the advanced VTR records and reproduces a test signal on and from a used magnetic tape. The advanced VTR detects characteristics of the magnetic tape (that is, the VHS tape or the S-VHS tape) from the reproduced test signal. Then, the advanced VTR records a video signal on the magnetic tape under recording conditions determined in response to the detected tape (the VHS tape or the S-VHS tape) characteristics.

As previously explained, the S-VHS VTR operates in the VHS mode when a VHS tape is used. Some VHS tapes have improved characteristics sufficient to store wide-band and high-quality video signals. In general, S-VHS tapes are higher in price than VHS tapes.

SUMMARY OF THE INVENTION

It is an object of this invention to provide a magnetic recording and reproducing apparatus which can record and reproduce a wide-band and high-quality video signal on and from an inexpensive magnetic tape such as a VHS tape.

A first aspect of this invention provides a magnetic recording and reproducing apparatus comprising first means for recording a video signal of a high-quality format, which has a first given frequency band, on a standard magnetic tape designed to record a video signal of a standard format having a second given frequency band narrower than the first given frequency band; and second means for reproducing a video signal of the high-quality format from a standard magnetic tape.

A second aspect of this invention provides a magnetic recording and reproducing apparatus comprising first means for recording a video signal of a first standard format, which has a first given frequency band, on a magnetic tape of a first standard type designed to record a video signal of the first standard format;

second means for recording a video signal of a second standard format, which has a second given frequency band wider than the first given frequency band, on a magnetic tape of a second standard type designed to record a video signal of the second standard format; third means for recording a video signal of a high-quality format, which has a third frequency band wider than the first frequency band, on a magnetic tape of the first standard type; fourth means for reproducing a video signal of the first standard format from a magnetic tape of the first standard type; fifth means for reproducing a video signal of the second standard format from a magnetic tape of the second standard type; and sixth means for reproducing a video signal of the high-quality format from a magnetic tape of the first standard type.

A third aspect of this invention is based on the first aspect thereof, and provides a magnetic recording and reproducing apparatus further comprising third means for detecting whether or not the video signal reproduced by the second means is of the high-quality format.

A fourth aspect of this invention is based on the third aspect thereof, and provides a magnetic recording and reproducing apparatus further comprising fourth means for detecting whether a tape-type identification hole is present in or absent from a housing of the standard magnetic tape accessed by the second means; fifth means for detecting a frequency band of the video signal reproduced by the second means; and sixth means for detecting whether or not the video signal reproduced by the second means is of the high-quality format in response to a result of the detection by the fourth means and the frequency band detected by the fifth means.

A fifth aspect of this invention is based on the third aspect thereof, and provides a magnetic recording and reproducing apparatus further comprising a reproducing FM equalizer for processing the video signal reproduced by the second means; a de-emphasis circuit for processing the video signal reproduced by the second means; a noise canceller for processing the video signal reproduced by the second means; and fourth means for controlling a signal processing characteristic of at least one of the reproducing FM equalizer, the de-emphasis circuit, and the noise canceller in response to a result of the detection by the third means.

A sixth aspect of this invention provides a magnetic recording and reproducing apparatus comprising first means for processing an input video signal into a processing-resultant video signal having a first given frequency band; second means for recording the processing-resultant video signal, which is generated by the first means, on a standard magnetic tape designed to record a standard-format video signal having a second given frequency band narrower than the first given frequency band; third means for reproducing a video signal having the first given frequency band from a standard magnetic tape; and fourth means for recovering an original video signal from the video signal reproduced by the third means.

A seventh aspect of this invention provides a magnetic recording and reproducing apparatus comprising first means for processing an input video signal into one among a video signal of a first standard format having a first given frequency band, a video signal of a second standard format having a second given frequency band wider than the first given frequency band, and a video signal of a high-quality format having a third given frequency band wider than the first given frequency band; second means for recording the video signal of the first standard format, which is generated by the first means, on a magnetic tape of a first standard type designed to record a video signal of the first standard format; third means for recording the video signal of the second standard format, which is generated by the first means, on a magnetic tape of a second standard type designed to record a video signal of the second standard format; fourth means for recording the video signal of the high-quality format, which is generated by the first means, on a magnetic tape of the first standard type; fifth means for reproducing a video signal from a magnetic tape; sixth means for detecting whether the video signal reproduced by the fifth means is of the first standard format, the second standard format, or the high-quality format; and seventh means for processing the video signal reproduced by the fifth means into an original video signal in response to a result of the detection by the sixth means.

An eighth aspect of this invention provides a magnetic recording and reproducing apparatus comprising first means for detecting whether a magnetic tape is of a first standard type, a second standard type, or a third standard type, the first standard type being designed to record a video signal of a first standard format having a first given frequency band, the second standard type being designed to record a video signal of the first standard format and being capable of recording a video signal having a frequency band wider than the first given frequency band, the third standard type being designed to record a video signal of a second standard format having a second given frequency band wider than the first given frequency band; second means for processing an input video signal into a video signal of the first standard format when the first means detects that the magnetic tape is of the first standard type, for processing the input video signal into a video signal of a high-quality format having a third given frequency band wider than the first given frequency band when the first means detects that the magnetic tape is of the second standard type, and for processing the input video signal into a video signal of the second standard format when the first means detects that the magnetic tape is of the third standard type; third means for recording the video signal generated by the second means on the magnetic tape; fourth means for reproducing a video signal from a magnetic tape; fifth means for detecting whether the video signal reproduced by the fourth means is of the first standard format, the second standard format, or the high-quality format; and sixth means for processing the video signal reproduced by the fifth means into an original video signal in response to a result of the detection by the fifth means.

A ninth aspect of this invention provides a video signal processing apparatus comprising a first video signal processing circuit; and a second video signal processing circuit connectable to the first video signal processing circuit; wherein the first video signal processing circuit and the second video signal processing circuit comprise means for processing either a video signal of a standard format or a video signal of a high-quality format into a record signal in the presence of the second video signal processing circuit connected to the first video signal processing circuit, and the video signal of the high-quality format is higher in picture quality than the video signal of the standard format and is wider in frequency band than the video signal of the standard format ; and wherein the first video signal processing circuit comprises means for processing a video signal of the standard format into a record signal in the absence of the second video signal processing circuit.

A tenth aspect of this invention is based on the ninth aspect thereof, and provides a video signal processing apparatus wherein in the presence of the second video signal processing circuit connected to the first video signal processing circuit, the first video signal processing circuit and the second video signal processing circuit are in a magnetic recording apparatus for a video signal of the high-quality format, and wherein in the absence of the second video signal processing circuit, the first video signal processing circuit is in a magnetic recording apparatus for a video signal of the standard format.

An eleventh aspect of this invention provides a video signal processing apparatus comprising a first video signal processing circuit; and a second video signal processing circuit connectable to the first video signal processing circuit; wherein the first video signal processing circuit and the second video signal processing circuit comprise means for processing either a reproduced video signal of a standard format or a reproduced video signal of a high-quality format into an original video signal in the presence of the second video signal processing circuit connected to the first video signal processing circuit, and the reproduced video signal of the high-quality format is higher in picture quality than the reproduced video signal of the standard format and is wider in frequency band than the reproduced video signal of the standard format; and wherein the first video signal processing circuit comprises means for processing a reproduced video signal of the standard format into an original video signal in the absence of the second video signal processing circuit.

A twelfth aspect of this invention is based on the eleventh aspect thereof, and provides a video signal processing apparatus wherein in the presence of the second video signal processing circuit connected to the first video signal processing circuit, the first video signal processing circuit and the second video signal processing circuit are in a magnetic reproducing apparatus for a video signal of the high-quality format, and wherein in the absence of the second video signal processing circuit, the first video signal processing circuit is in a magnetic reproducing apparatus for a video signal of the standard format.

DESCRIPTION OF THE PREFERRED EMBODIMENTS

First Embodiment

A magnetic recording and reproducing apparatus according to a first embodiment of this invention can operate in either a recording mode or a playback mode. The magnetic recording and reproducing apparatus is also referred to as the apparatus. The recording mode of operation of the apparatus can be changed among different modes including a normal-quality recording mode and high-quality recording modes. The normal-quality recording mode corresponds to a VHS recording mode. One of the high-quality recording modes corresponds to an S-VHS recording mode. Similarly, the playback mode of operation of the apparatus can be changed among different modes including a normal-quality playback mode and high-quality playback modes. The normal-quality playback mode corresponds to a VHS playback mode. One of the high-quality playback modes corresponds to an S-VHS playback mode. The apparatus can use either a normal-quality magnetic tape or a high-quality magnetic tape. The normal-quality magnetic tape corresponds to a VHS tape. The high-quality magnetic tape corresponds to an S-VHS tape.

The apparatus of the first embodiment of this invention is divided into a recording side and a reproducing side. First, the recording side of the apparatus will be explained hereinafter.

Figure 1:
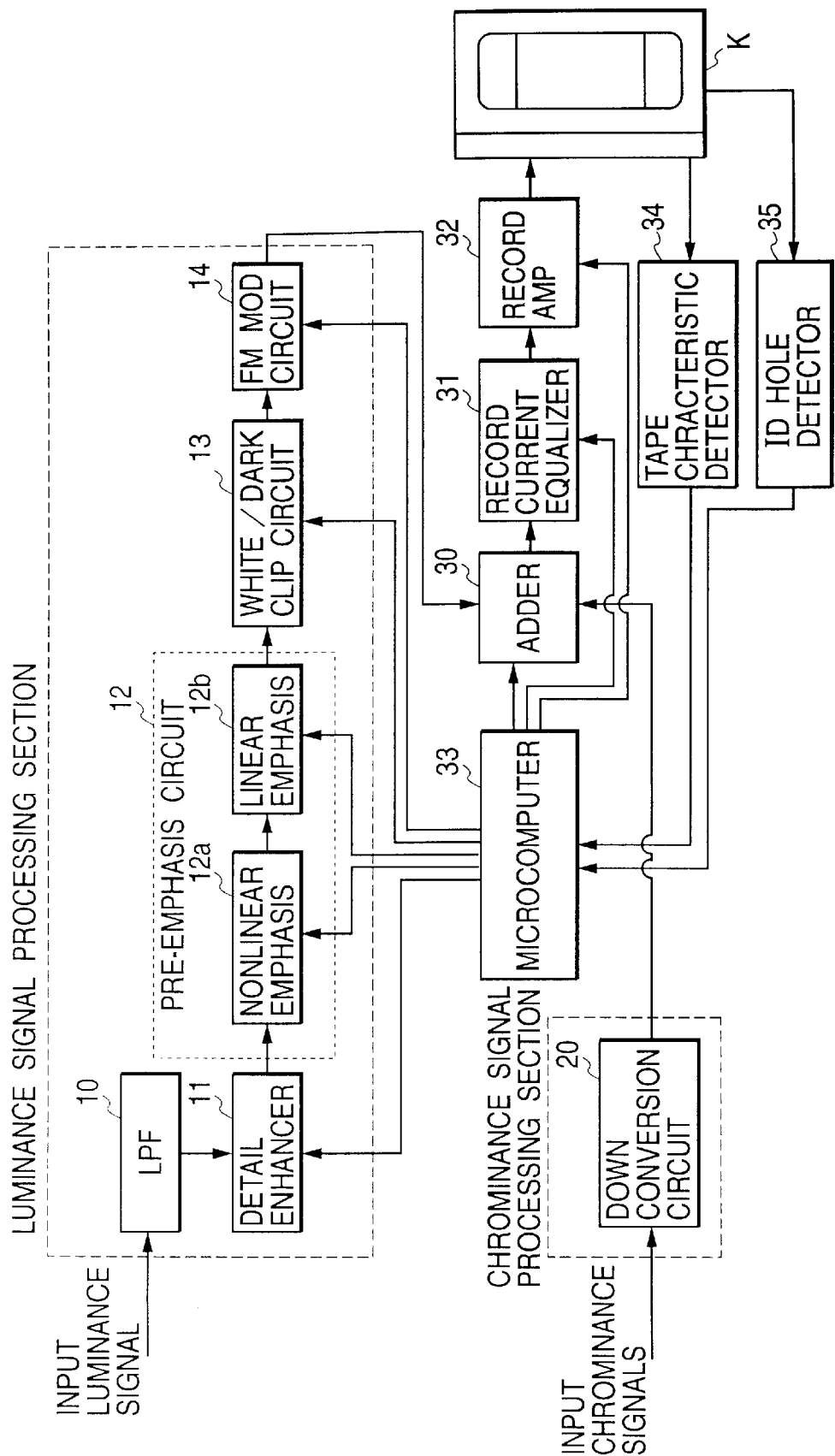
FIG. 1 is a block diagram of a recording side of a magnetic recording and reproducing apparatus according to a first embodiment of this invention.

FIG. 1 shows the recording side of the apparatus according to the first embodiment of this invention. The apparatus recording side in FIG. 1 is basically divided into a luminance signal processing section and a chrominance signal processing section. The luminance signal processing section converts or modulates an input luminance signal into an FM modulated luminance signal. The chrominance signal processing section converts input chrominance signals into frequency-down-converted chrominance signals. The FM modulated luminance signal and the frequency-down-converted chrominance signals are combined and multiplexed into a composite video signal on a frequency division basis. The composite video signal is transmitted to magnetic heads via a recording amplifier, and is recorded on a magnetic tape by the magnetic heads.

In the apparatus recording side of FIG. 1, the luminance signal processing section includes a low pass filter (LPF) 10, a detail enhancer 11, a pre-emphasis circuit 12, a white/dark clip circuit 13, and an FM modulation circuit 14 which are successively connected in that order.

The low pass filter 10 receives an input luminance signal, and removes high-frequency components from the input luminance signal. The low pass filter 10 outputs the resultant luminance signal to the detail enhancer 11. The detail enhancer 11 processes the output signal of the low pass filter 10 to compensate for signal components deleted by a noise canceller during playback. The detail enhancer 11 outputs the resultant luminance signal to the pre-emphasis circuit 12.

The pre-emphasis circuit 12 includes a nonlinear emphasis circuit 12a and a linear emphasis circuit 12b connected in series.

The nonlinear emphasis circuit 12a and the linear emphasis circuit 12b emphasize high-frequency luminance components to improve an S/N ratio in luminance. Specifically, the nonlinear emphasis circuit 12a emphasizes high-frequency components of the output signal of the detail enhancer 11 to a degree depending on the level of the high-frequency components. The degree of the emphasis increases as the level of the high-frequency components decreases.

The nonlinear emphasis circuit 12a outputs the resultant luminance signal to the linear emphasis circuit 12b. The linear emphasis circuit 12b emphasizes high-frequency components of the output signal of the nonlinear emphasis circuit 12a to a degree independent of the level of the high-frequency components. The linear emphasis circuit 12b outputs the resultant luminance signal to the white/dark clip circuit 13.

The white/dark clip circuit 13 removes spike components from the output signal of the pre-emphasis circuit 12 to prevent the occurrence of luminance reversal. In general, the spike components are present at rising edges and falling edges in the output signal of the pre-emphasis circuit 12. The white/dark clip circuit 13 outputs the resultant luminance signal to the FM modulation circuit 14.

The detail enhancer 11, the pre-emphasis circuit 12, and the white/dark clip circuit 13 are connected to a microcomputer 33.

The signal processing characteristics of the detail enhancer 11, the pre-emphasis circuit 12, and the white/dark clip circuit 13 are determined by control signals fed from the microcomputer 33.

The FM modulation circuit 14 converts the output signal of the white/dark clip circuit 13 into an FM modulated luminance signal having a frequency deviation which can be changed between a frequency band for the VHS format and a frequency band for the S-VHS format. The FM modulation circuit 14 is connected to the microcomputer 33. The frequency deviation in the FM modulated luminance signal is set to either the VHS type or the S-VHS type by a control signal fed from the microcomputer 33. The FM modulation circuit 14 outputs the FM modulated luminance signal to an adder 30.

The FM modulation circuit 14 includes an oscillator (not shown) which generates a predetermined test signal having a prescribed frequency. As will be explained later, the test signal is used in detecting characteristics of a used magnetic tape.

In the apparatus recording side of FIG. 1, the chrominance signal processing section includes a down conversion circuit 20. The down conversion circuit 20 receives input chrominance signals, and subjects the input chrominance signals to frequency down conversion. Thereby, the down conversion circuit 20 generates frequency-down-converted chrominance signals from the input chrominance signals. The down conversion circuit 20 outputs the frequency-down-converted chrominance signals to the adder 30.

The adder 30 combines or multiplexes the FM modulated luminance signal and the frequency-down-converted chrominance signals into a composite video signal on a frequency division basis.

The composite video signal is a record signal, that is, a signal to be recorded. The adder 30 outputs the composite video signal to a recording current equalizer 31.

The recording current equalizer 31 processes the output signal of the adder 30 to compensate for variations in frequency response characteristics of parts including magnetic heads. The recording current equalizer 31 outputs the resultant video signal to a recording amplifier 32. The recording amplifier 32 enlarges the output signal of the recording current equalizer 31 to a level suited to signal recording on a magnetic tape contained in a cassette K. The recording amplifier 32 outputs the resultant video signal. The output signal of the recording amplifier 32 is transmitted via rotary transformers to magnetic heads before being recorded on the magnetic tape in the cassette K by the magnetic heads.

The adder 30, the recording current equalizer 31, and the recording amplifier 32 are connected to the microcomputer 33. The mixing ratio between the FM modulated luminance signal and the frequency-down-converted chrominance signals in the adder 30 is determined by a control signal fed from the microcomputer 33. Conditions of the signal processing by the recording current equalizer 31 are determined by a control signal fed from the microcomputer 33. The gain of the recording amplifier 32 is determined by a control signal fed from the microcomputer 33.

The apparatus recording side in FIG. 1 includes a tape characteristic detector 34 and an identification hole detector 35.

The device 34 detects the characteristics of the magnetic tape in the cassette K. The tape characteristic detector 34 outputs a signal to the microcomputer 33 which represents the detected tape characteristics. The device 35 detects whether an identification hole is present in or absent from the tape casette K. In general, a cassette containing a S-VHS tape has an identification hole. On the other hand, a cassette containing a VHS tape does not have an identification hole.

Accordingly, when the device 35 detects the presence of an identification hole in the tape cassette K, it is decided that the magnetic tape in the cassette K is of the S-VHS type. On the other hand, when the device 35 detects the absence of an identification hole from the tape cassette K, it is decided that the magnetic tape in the cassette K is of the VHS type. The identification hole detector 35 outputs a signal to the microcomputer 33 which represents whether an identification hole is present in or absent from the tape casette K, that is, whether the magnetic tape in the cassette K is of the S-VHS type or the VHS type.

The microcomputer 33 includes a combination of an input/output port, a CPU, a ROM, and a RAM. The microcomputer 33 operates in accordance with a program stored in the ROM.

According to a segment of the program, the microcomputer 33 selects a desired recording mode of operation of the apparatus from among a VHS recording mode, an S-VHS recording mode, a first high-quality recording mode, and a second high-quality recording mode in response to the output signals of the tape characteristic detector 34 and the identification hole detector 35. Then, the microcomputer 33 determines the characteristics of the signal processing by the detail enhancer 11, the pre-emphasis circuit 12, the white/dark clip circuit 13, the FM modulation circuit 14, the adder 30, the recording current equalizer 31, and the recording amplifier 32 in accordance with the desired recording mode of operation. Thereby, the microcomputer 33 sets an actual recording mode of operation of the apparatus into agreement with the desired recording mode.

The apparatus recording side in FIG. 1 operates as follows. When the tape cassette K is placed into the apparatus, the device 35 detects whether an identification hole is present in or absent from the tape casette K. In the presence of an identification hole, the device 35 decides that the magnetic tape in the cassette K is of the S-VHS type. In the absence of an identification hole, the device 35 decides that the magnetic tape in the cassette K is of the VHS type. The identification hole detector 35 informs the microcomputer 33 of whether the magnetic tape in the cassette K is of the VHS type or the S-VHS type.

In the case where the magnetic tape in the cassette K is decided to be of the VHS type, the microcomputer 33 starts a testing process to decide whether or not the characteristics of the magnetic tape are sufficient for the recording of a video signal of the S-VHS format or the recording of a video signal having a picture quality higher than that of a VHS-format video signal.

During the testing process, the microcomputer 33 activates the oscillator in the FM modulation circuit 14 so that the oscillator generates a predetermined test signal. The test signal is transmitted from the FM modulation circuit 14 to the recording amplifier 32 via the adder 30 and the recording current equalizer 31. The microcomputer 33 controls the recording amplifier 32 so that the test signal is amplified thereby to a given level. The recording amplifier 32 feeds the resultant test signal to the magnetic heads via the rotary transformers. The magnetic heads record the test signal on the magnetic tape in the cassette K. Thus, during the testing process, the test signal is recorded on the magnetic tape at a predetermined recording level. Then, the test signal is reproduced from the magnetic tape in the cassette K by a magnetic reproducing device of, for example, a conventional type. The magnetic reproducing device may be a portion of the reproducing side of the apparatus. The reproduced test signal is fed to the tape characteristic detector 34. The tape characteristic detector 34 may contain the magnetic reproducing device. The tape characteristic detector 34 includes a level detector for deciding which of three predetermined different levels the level of the reproduced test signal corresponds to. The three predetermined different levels are referred to as the lowest level "1", the intermediate level "2", and the highest level "3" respectively. The tape characteristic detector 34 informs the microcomputer 33 of the level decision result.

Specifically, the tape characteristic detector 34 compares the level of the reproduced test signal with a lower reference level and a higher reference level. When the level of the reproduced test signal is smaller than the lower reference level, the tape characteristic detector 34 decides that the level of the reproduced test signal corresponds to the lowest level "1". When the level of the reproduced test signal is between the lower reference level and the higher reference level, the tape characteristic detector 34 decides that the level of the reproduced test signal corresponds to the intermediate level "2". When the level of the reproduced test signal is greater than the higher reference level, the tape characteristic detector 34 decides that the level of the reproduced test signal corresponds to the highest level "3".

In other words, the tape characteristic detector 34 decides whether the quality of the magnetic tape in the cassette K is in a low range, an intermediate range, or a high range. The previously-indicated lower reference level corresponds to the boundary between the low quality range and the intermediate quality range.

The previously-indicated higher reference level corresponds to the boundary between the intermediate quality range and the high quality range. When the level of the reproduced test signal corresponds to the lowest level "1", the tape characteristic detector 34 decides that the quality of the magnetic tape in the cassette K is in the low range. When the level of the reproduced test signal corresponds to the intermediate level "2", the tape characteristic detector 34 decides that the quality of the magnetic tape in the cassette K is in the intermediate range. When the level of the reproduced test signal corresponds to the highest level "3", the tape characteristic detector 34 decides that the quality of the magnetic tape in the cassette K is in the high range.

The microcomputer 33 responds to the result of the decision by the tape characteristic detector 34 as follows. When it is decided that the level of the reproduced test signal corresponds to the lowest level "1", the microcomputer 33 sets operation of the apparatus to a VHS recording mode. When it is decided that the level of the reproduced test signal corresponds to the intermediate level "2", the microcomputer 33 sets operation of the apparatus to a first high-quality recording mode. When it is decided that the level of the reproduced test signal corresponds to the highest level "3", the microcomputer 33 sets operation of the apparatus to a second high-quality recording mode.

On the other hand, in the case where the magnetic tape in the cassette K is decided to be of the S-VHS type, the microcomputer 33 sets operation of the apparatus to an S-VHS recording mode.

During the first high-quality recording mode of operation, the microcomputer 33 sets the cutoff frequency of the low pass filter 10 to 5 MHz, if necessary. In addition, the microcomputer 33 sets the characteristics of the signal processing by the detail enhancer 11, the pre-emphasis circuit 12, the white/dark clip circuit 13, and the recording current equalizer 31 into line with the recording of a high-quality video signal on a VHS tape corresponding to the intermediate level "2". Furthermore, the microcomputer 33 adjusts the signal mixing ratio in the adder 30 in response to the signal recording level determined by the recording amplifier 32. Also, the microcomputer 33 controls the FM modulation circuit 14 to provide a frequency deviation of 5.4 to 7.0 MHz.

During the second high-quality recording mode of operation, the microcomputer 33 sets the cutoff frequency of the low pass filter 10 to 5 MHz, if necessary. In addition, the microcomputer 33 sets the characteristics of the signal processing by at least one member of the detail enhancer 11, the pre-emphasis circuit 12, the white/dark clip circuit 13, and the recording current equalizer 31 into line with the recording of a high-quality video signal on a VHS tape corresponding to the highest level "3". Furthermore, the microcomputer 33 adjusts the signal mixing ratio in the adder 30 in response to the signal recording level determined by the recording amplifier 32. Also, the microcomputer 33 controls the FM modulation circuit 14 to provide a frequency deviation of 5.4 to 7.0 MHz.

During the VHS recording mode of operation, the microcomputer 33 sets the cutoff frequency of the low pass filter 10 to 3 MHz, if necessary. In addition, the microcomputer 33 sets the characteristics of the signal processing by the detail enhancer 11, the pre-emphasis circuit 12, the white/dark clip circuit 13, the adder 30, the recording current equalizer 31, and the recording amplifier 32 into line with the recording of a VHS video signal on a VHS tape. Furthermore, the microcomputer 33 controls the FM modulation circuit 14 to provide a frequency deviation of 3.4 to 4.4 MHz.

During the S-VHS recording mode of operation, the microcomputer 33 sets the cutoff frequency of the low pass filter 10 to 5 MHz, if necessary. In addition, the microcomputer 33 sets the characteristics of the signal processing by the detail enhancer 11, the pre-emphasis circuit 12, the white/dark clip circuit 13, the adder 30, the recording current equalizer 31, and the recording amplifier 32 into line with the recording of an S-VHS video signal on an S-VHS tape. Furthermore, the microcomputer 33 controls the FM modulation circuit 14 to provide a frequency deviation of 5.4 to 7.0 MHz.

As understood from the previous explanation, the apparatus recording side in FIG. 1 records a high-quality video signal on a VHS tape corresponding to the intermediate level "2" or the highest level "3". The high-quality video signal can be reproduced from the VHS tape by a VTR of the S-VHS standard or the reproducing side of the apparatus.

The first high-quality recording mode of operation and the second high-quality recording mode of operation will be further explained. During the first or second high-quality recording mode of operation, the detail enhancer 11 and the pre-emphasis circuit 12 amplify high-frequency components of the input luminance signal at a degree which is lower than that used during the S-VHS recording mode.

Figure 2:
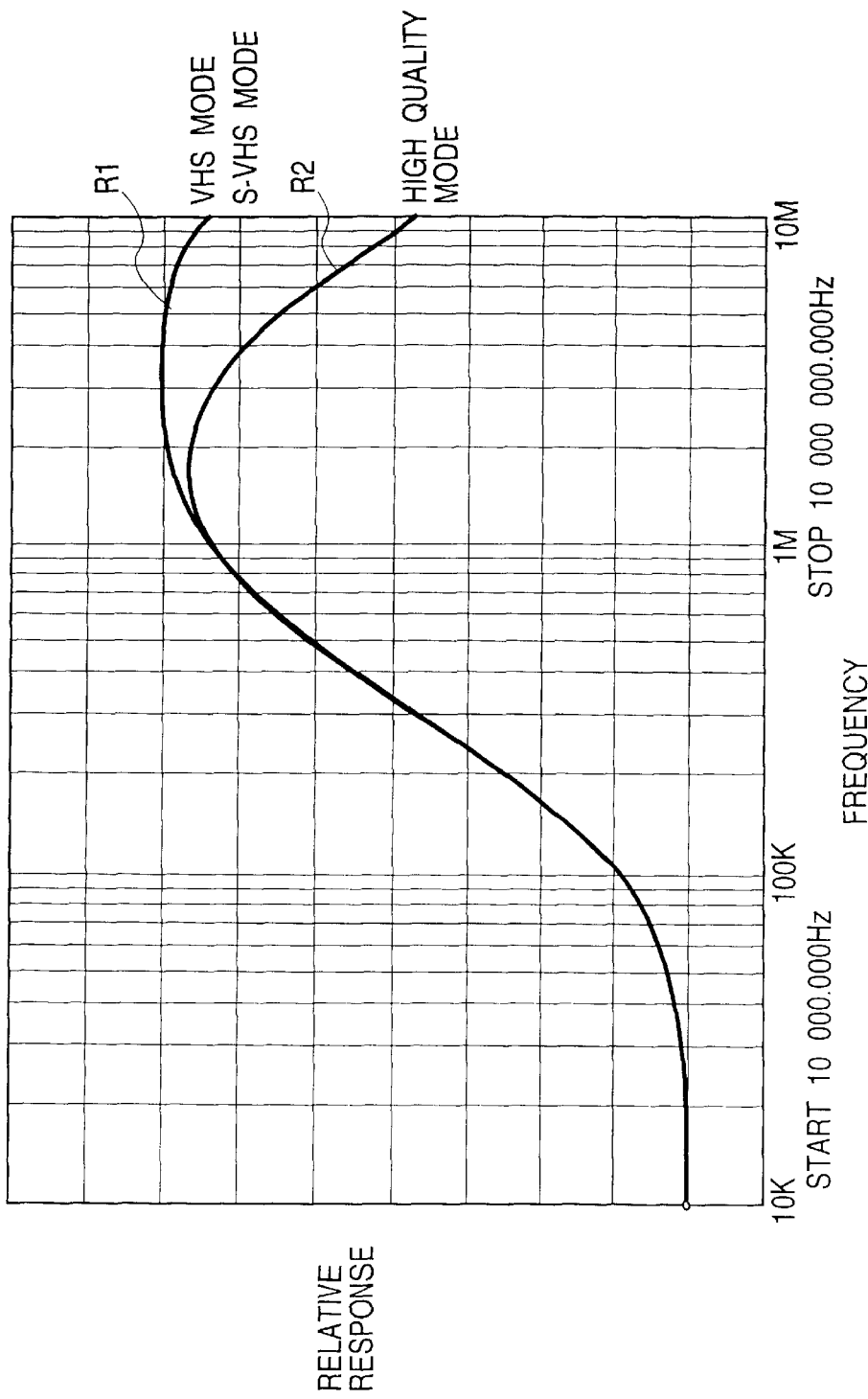
FIG. 2 is a diagram of the changeable frequency response of a linear emphasis circuit in the apparatus recording side of FIG. 1.

The frequency response of the linear emphasis circuit 12b can be changed between a first type R1 and a second type R2 as shown in FIG. 2. The first type R1 is selected during the VHS recording mode of operation and the S-VHS recording mode of operation.

The second type R2 is selected during the first high-quality recording mode of operation and the second high-quality recording mode of operation. As shown in FIG. 2, the second type R2 causes less amplification of high-frequency signal components in comparison with the first type R1.

Figure 3:
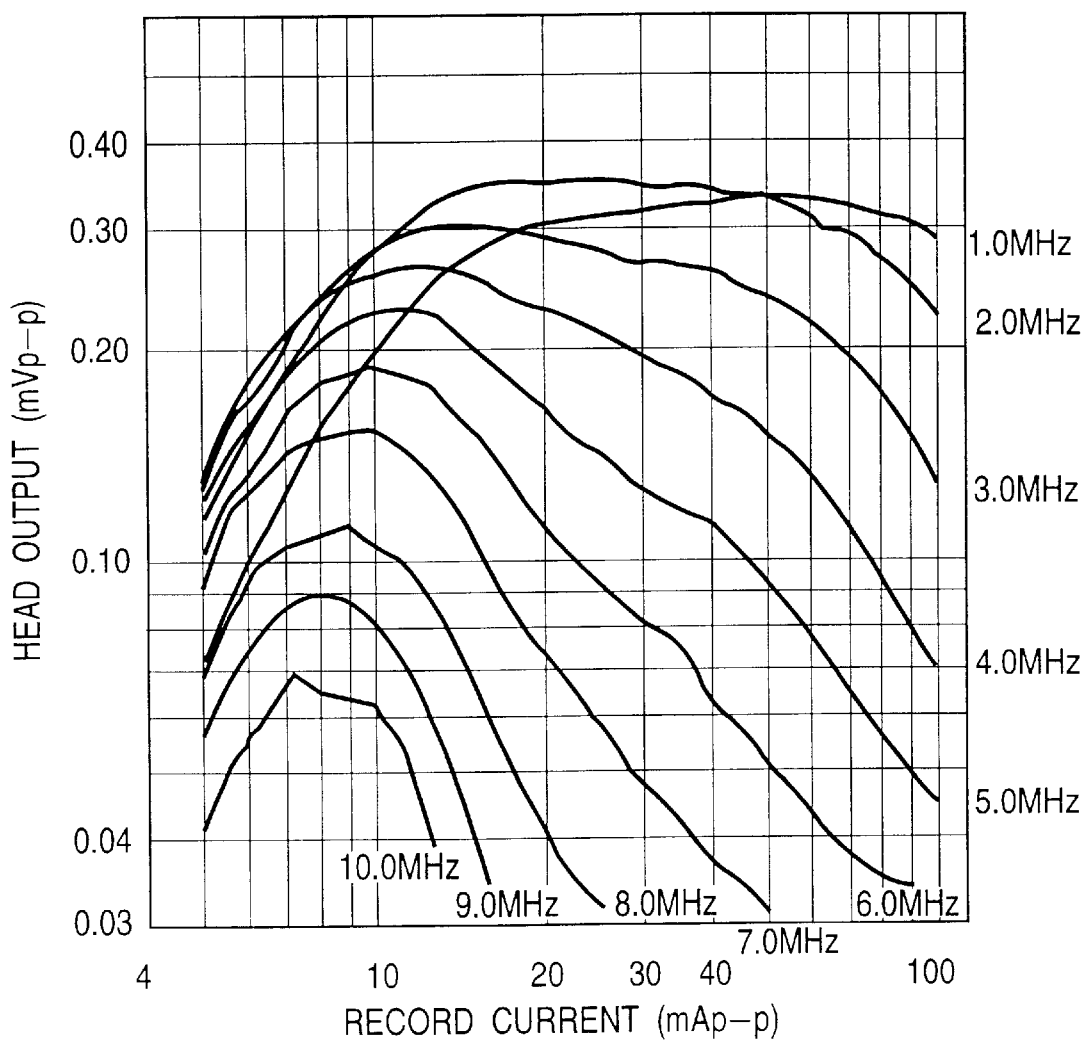
FIG. 3 is a diagram of the electromagnetic conversion frequency response of a VHS tape.
Figure 4:
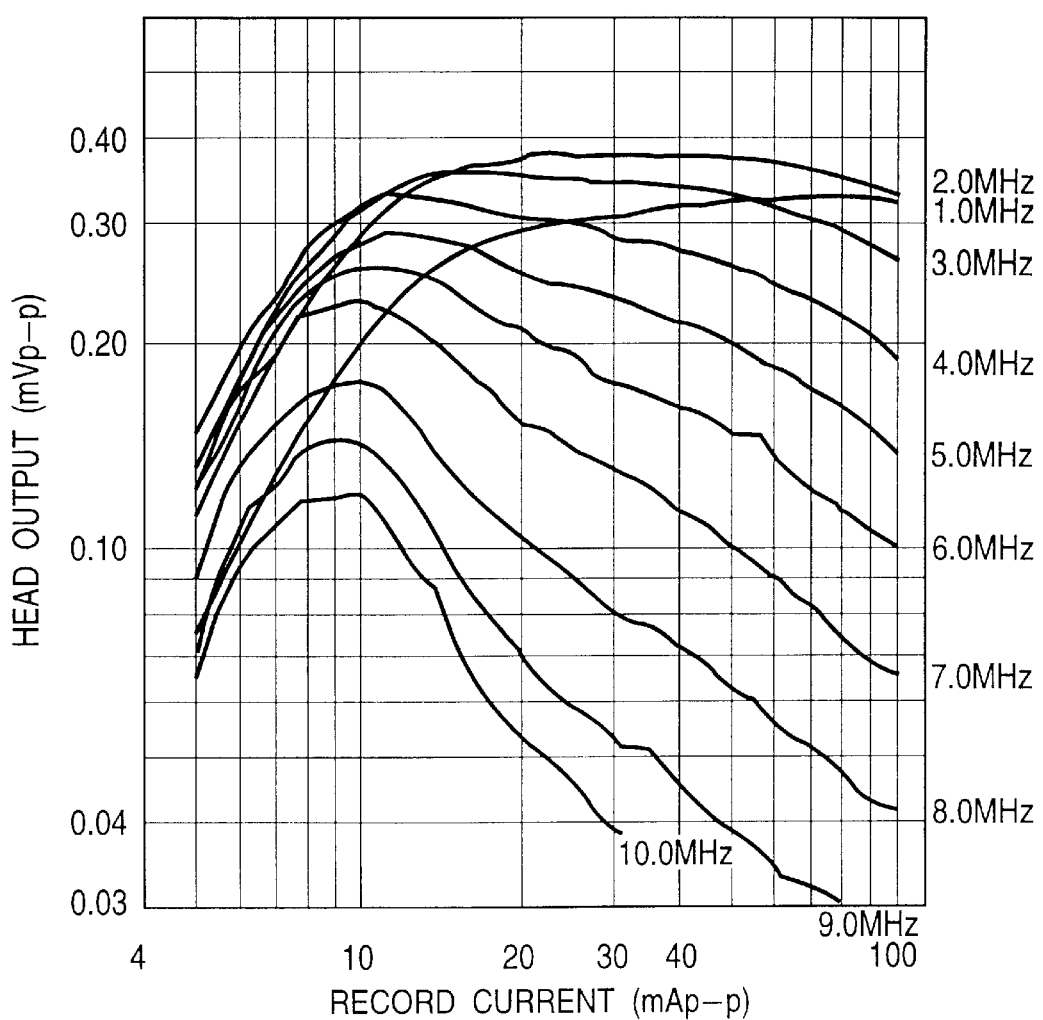
FIG. 4 is a diagram of the electromagnetic conversion frequency response of an S-VHS tape.

During the first or second high-quality recording mode of operation, the white clip level in the white/dark clip circuit 13 is set to 190% ±10%. On the other hand, during the S-VHS recording mode of operation, the white clip level in the white/dark clip circuit 13 is set to 210% ±10%. This change of the white clip level is implemented in view of the following fact. As shown in FIGS. 3 and 4, a VHS tape causes greater attenuation of high-frequency components of a reproduced signal in comparison with an S-VHS tape. The reduced white clip level during the first or second high-quality recording mode of operation suppresses the shortest recording wavelength, and prevents the occurrence of luminance reversal.

During the first or second high-quality recording mode of operation, and the S-VHS recording mode of operation, the dark clip level in the white/dark clip circuit 13 is set to −70% ±10%.

During the first or second high-quality recording mode of operation, the FM modulation circuit 14 provides a frequency deviation of 5.4 to 7.0 MHz in the FM modulated luminance signal.

This frequency deviation is the same as that provided during the S-VHS recording mode of operation. Therefore, the recorded signal frequency allocation provided during the first or second high-quality recording mode of operation is the same as that provided during the S-VHS recording mode of operation.

The adder 30 is controlled by the microcomputer 33 so that the mixing ratio between the FM modulated luminance signal and the frequency-down-converted chrominance signals varies in response to whether the magnetic tape in the cassette K corresponds to the lowest level "1", the intermediate level "2", or the highest level "3", that is, whether the apparatus recording side in FIG. 1 operates in the VHS recording mode, the first high-quality recording mode, or the second high-quality recording mode. Specifically, during the first or second high-quality recording mode of operation, the signal mixing ratio in the adder 30 is set to a level such that a signal distortion caused by cross modulation and occurring upon recording onto a magnetic tape will be in the allowable range prescribed by the S-VHS standard.

The recording current equalizer 31 is controlled by the microcomputer 33 to compensate for the difference in electromagnetic conversion frequency response between an S-VHS tape and a VHS tape. Specifically, during the first or second high-quality recording mode of operation, the recording current equalizer 31 provides greater suppression of low-frequency signal components than that prescribed by the S-VHS standard.

Figure 5:
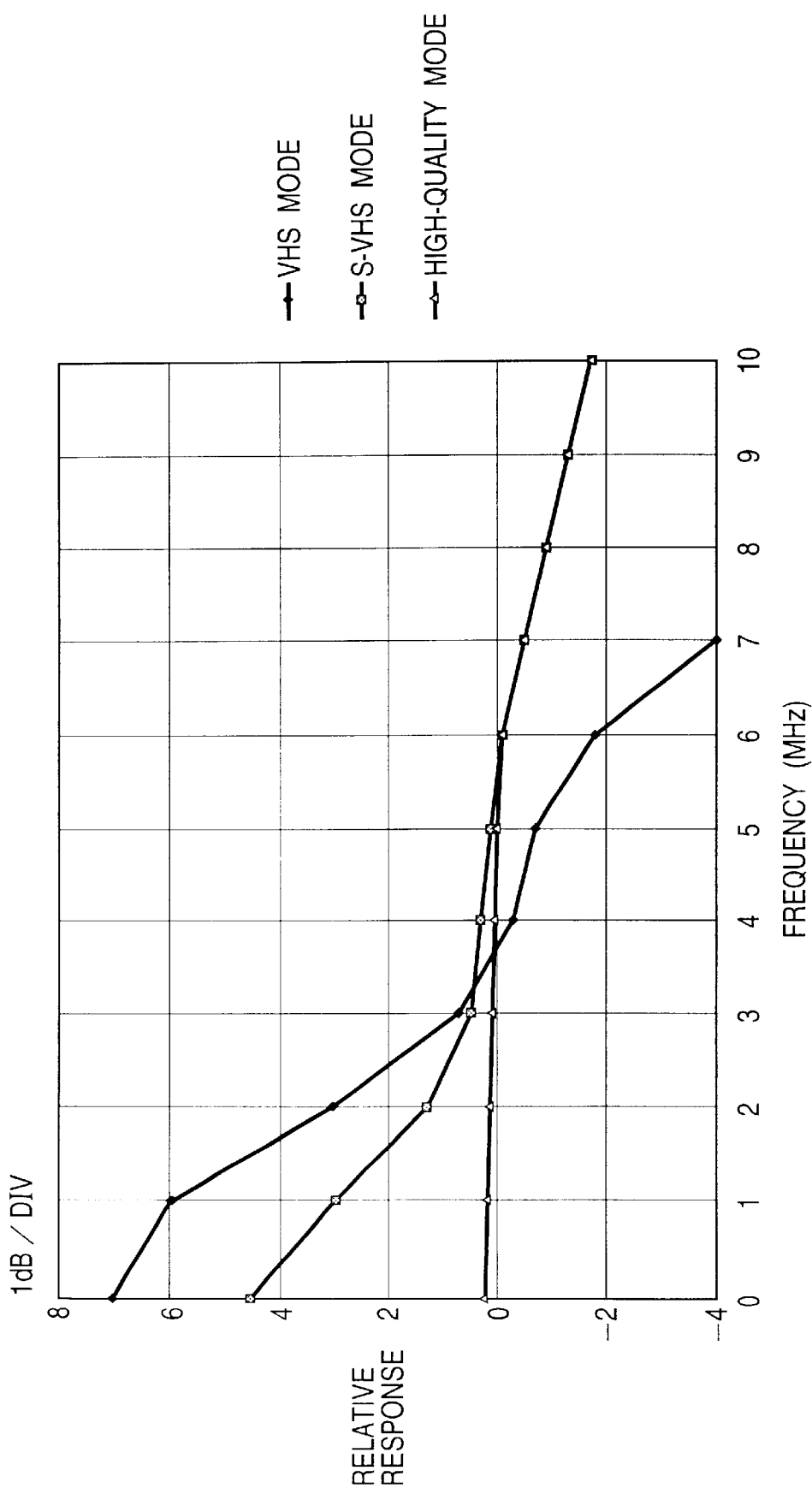
FIG. 5 is a diagram of the changeable frequency response of a recording current equalizer in the apparatus recording side of FIG. 1.

As shown in FIG. 5, the frequency response of the recording current equalizer 31 can be changed among first, second, and third types. The frequency response of the recording current equalizer 31 is set to the first type during the VHS recording mode of operation. The frequency response of the recording current equalizer 31 is set to the second type during the S-VHS recording mode of operation. The frequency response of the recording current equalizer 31 is set to the third type during the first or second high-quality recording mode of operation. The frequency response of the third type (the high-quality type) provides less suppression of high-frequency signal components than that provided by the frequency response of the first type (the VHS type). During the first or second high-quality recording mode of operation, the recording amplifier 32 is controlled by the microcomputer 33 so as to amplify the output signal of the recording current equalizer 31 to a level which corresponds to the signal recording level used in the testing process. The recording amplifier 32 feeds the amplification-resultant video signal to the magnetic heads via the rotary transformers. The magnetic heads record the video signal on the magnetic tape in the cassette K. In this way, during the first or second high-quality recording mode of operation, the apparatus recording side in FIG. 1 records a high-quality video signal on the VHS tape corresponding to the intermediate level "2" or the highest level "3". The high-quality video signal can be reproduced from the VHS tape by a VTR of the S-VHS standard or the reproducing side of the apparatus.

The characteristics of the signal processing by the detail enhancer 11, the pre-emphasis circuit 12, the white/dark clip circuit 13, and the recording current equalizer 31 are changed by the microcomputer 33 in response to the result of the decision regarding whether the magnetic tape in the cassette K corresponds to the intermediate level "2" or the highest level "3", that is, whether the apparatus recording side in FIG. 1 operates in the first high-quality recording mode or the second high-quality recording mode. For example, in the case where the magnetic tape in the cassette K corresponds to the intermediate level "2", that is, in the case where the apparatus recording side in FIG. 1 operates in the first high-quality recording mode, the characteristics of the signal processing by all the detail enhancer 11, the pre-emphasis circuit 12, the white/dark clip circuit 13, and the recording current equalizer 31 are set to those suited to record a high-quality video signal on a VHS tape corresponding to the intermediate level "2".

On the other hand, in the case where the magnetic tape in the cassette K corresponds to the highest level "3", that is, in the case where the apparatus recording side in FIG. 1 operates in the second high-quality recording mode, the characteristics of the signal processing by only a predetermined member or members of the detail enhancer 11, the pre-emphasis circuit 12, the white/dark clip circuit 13, and the recording current equalizer 31 are set to those suited to record a high-quality video signal on a VHS tape corresponding to the highest level "3".

Figure 6:
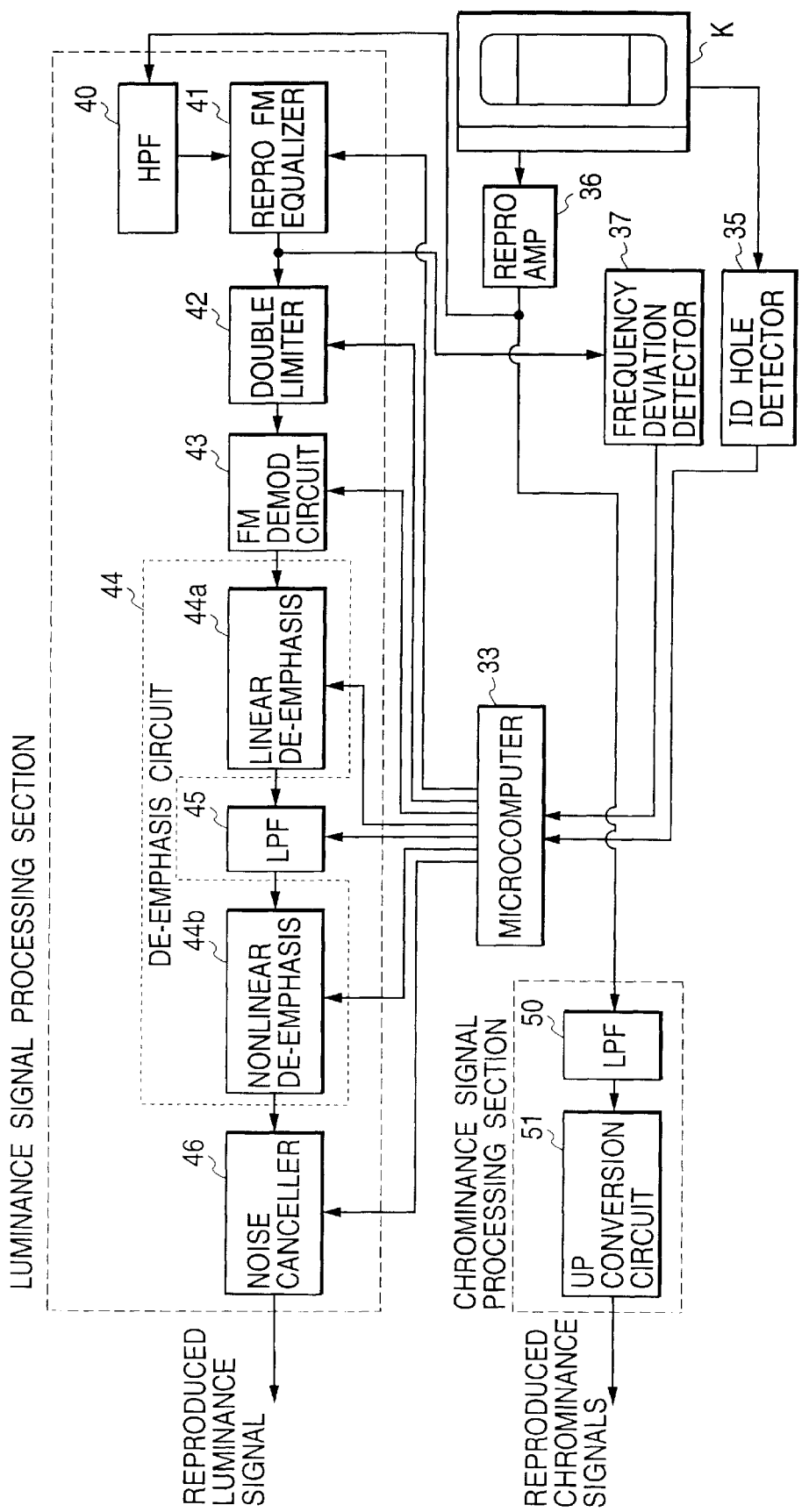
FIG. 6 is a block diagram of a reproducing side of the magnetic recording and reproducing apparatus according to the first embodiment of this invention.

The reproducing side of the apparatus will be explained hereinafter. FIG. 6 shows the reproducing side of the apparatus according to the first embodiment of this invention. The apparatus reproducing side in FIG. 6 includes a reproducing amplifier 36 connected to the magnetic heads via the rotary transformers. The magnetic heads reproduce a signal from the magnetic tape in the cassette K. The reproduced signal is transmitted from the magnetic heads to the reproducing amplifier 36 via the rotary transformers. The reproducing amplifier 36 enlarges the reproduced signal to a given level, and outputs the resultant reproduced signal.

The apparatus reproducing side in FIG. 6 is basically divided into a luminance signal processing section and a chrominance signal processing section which follow the reproducing amplifier 36. The luminance signal processing section receives the output signal of the reproducing amplifier 36, and extracts luminance components therefrom. The luminance signal processing section generates or recovers a reproduced luminance signal from the extracted luminance components. The luminance signal processing section outputs the reproduced luminance signal. The chrominance signal processing section receives the output signal of the reproducing amplifier 36, and extracts chrominance components therefrom.

The chrominance signal processing section generates or recovers reproduced chrominance signals from the extracted chrominance components. The chrominance signal processing section outputs the reproduced chrominance signals. The reproduced luminance signal outputted from the luminance signal processing section and the reproduced chrominance signals outputted from the chrominance signal processing section may be combined into a reproduced composite video signal.

In the apparatus reproducing side of FIG. 6, the luminance signal processing section includes a high pass filter (HPF) 40, a reproducing FM equalizer 41, a double limiter 42, an FM demodulation circuit 43, a linear de-emphasis circuit 44a, a low pass filter (LPF) 45, a nonlinear de-emphasis circuit 44b, and a noise canceller 46 which are successively connected in that order.

The linear de-emphasis circuit 44a and the nonlinear de-emphasis circuit 44b form a composite de-emphasis circuit 44.

The high pass filter 40 receives the output signal of the reproducing amplifier 36. The high pass filter 40 removes low-frequency components from the output signal of the reproducing amplifier 36, and thereby extracts luminance components from the output signal of the reproducing amplifier 36. The extracted luminance components correspond to a reproduced FM modulated luminance signal. The high pass filter 40 outputs a signal representative of the extracted luminance components to the reproducing FM equalizer 41. The reproducing FM equalizer 41 subjects the output signal of the high pass filter 40 to an equalization process designed to compensate for the group delay characteristic and the frequency response of a tape-head signal transmission arrangement including the magnetic tape and the magnetic heads. The reproducing FM equalizer 41 outputs the resultant signal to the double limiter 42.

The double limiter 42 separates the output signal of the reproducing FM equalizer 41 into a high-frequency signal and a low-frequency signal. The double limiter 42 subjects the high-frequency signal and the low-frequency signal to respective limiting processes to prevent the occurrence of luminance reversal. The double limiter 42 outputs the resultant signal to the FM demodulation circuit 43. The FM demodulation circuit 43 recovers a basic reproduced luminance signal from the output signal of the double limiter 42. The FM demodulation circuit 43 outputs the basic reproduced luminance signal to the linear de-emphasis circuit 44a.

The linear de-emphasis circuit 44a and the nonlinear de-emphasis circuit 44b de-emphasize high-frequency components of the basic reproduced luminance signal (the output signal of the FM demodulation circuit 43) to improve an S/N ratio in luminance. Specifically, the linear de-emphasis circuit 44a de-emphasizes high-frequency components of the basic reproduced luminance signal (the output signal of the FM demodulation circuit 43) to a degree independent of the level of the high-frequency components. The linear de-emphasis circuit 44a outputs the resultant luminance signal to the low pass filter 45. The low pass filter 45 removes a carrier from the output signal of the linear de-emphasis circuit 44a.

The nonlinear de-emphasis circuit 44b de-emphasizes high-frequency components of the output signal of the low pass filter 45 to a degree depending on the level of the high-frequency components. The nonlinear de-emphasis circuit 44b outputs the resultant luminance signal to the noise canceller 46. The noise canceller 46 removes high-frequency noise components from the output signal of the nonlinear de-emphasis circuit 44b. The noise canceller 46 outputs the resultant luminance signal as a final reproduced luminance signal.

The microcomputer 33 is common to the apparatus recording side in FIG. 1 and the apparatus reproducing side in FIG. 6. The reproducing FM equalizer 41, the double limiter 42, the FM demodulation circuit 43, the linear de-emphasis circuit 44a, the low pass filter 45, the nonlinear de-emphasis circuit 44b, and the noise canceller 46 are connected to the microcomputer 33. Conditions of the signal processing by the reproducing FM equalizer 41, the double limiter 42, the FM demodulation circuit 43, the linear de-emphasis circuit 44a, the low pass filter 45, the nonlinear de-emphasis circuit 44b, and the noise canceller 46 are determined by control signals fed from the microcomputer 33.

It should be noted that the high pass filter 40 may be connected to the microcomputer 33, and that conditions of the signal processing by the high pass filter 40 may be determined by a control signal fed from the microcomputer 33.

In the apparatus reproducing side of FIG. 6, the chrominance signal processing section includes a low pass filter (LPF) 50 and an up conversion circuit 51 connected in series.

The low pass filter 50 receives the output signal of the reproducing amplifier 36. The low pass filter 50 removes high-frequency components from the output signal of the reproducing amplifier 36, and thereby extracts chrominance components from the output signal of the reproducing amplifier 36. The extracted chrominance components correspond to reproduced frequency-down-converted chrominance signals. The low pass filter 50 outputs a signal representative of the extracted chrominance components to the up conversion circuit 51. The up conversion circuit 51 subjects the output signal of the low pass filter 50 to frequency up conversion. Thereby, the up conversion circuit 51 recovers original-frequency chrominance signals from the output signal of the low pass filter 50. The up conversion circuit 51 outputs the recovered chrominance signals as final reproduced chrominance signals.

The identification hole detector 35 is common to the apparatus recording side in FIG. 1 and the apparatus reproducing side in FIG. 6. As previously explained, the device 35 detects whether an identification hole is present in or absent from the tape casette K. In general, a cassette containing a S-VHS tape has an identification hole. On the other hand, a cassette containing a VHS tape does not have an identification hole. Accordingly, when the device 35 detects the presence of an identification hole in the tape cassette K, it is decided that the magnetic tape in the cassette K is of the S-VHS type. On the other hand, when the device 35 detects the absence of an identification hole from the tape cassette K, it is decided that the magnetic tape in the cassette K is of the VHS type. The identification hole detector 35 outputs a signal to the microcomputer 33 which represents whether an identification hole is present in or absent from the tape casette K, that is, whether the magnetic tape in the cassette K is of the S-VHS type or the VHS type.

The apparatus reproducing side in FIG. 6 includes a frequency deviation detector 37 connected to the output side of the reproducing FM equalizer 41. The frequency deviation detector 37 receives the output signal of the reproducing FM equalizer 41, that is, the reproduced FM modulated luminance signal. The device 37 detects whether the reproduced FM modulated luminance signal has a frequency deviation of 3.4 to 4.4 MHz or 5.4 to 7.0 MHz. In other words, the device 37 detects whether the reproduced FM modulated luminance signal is of the VHS format or the high-quality format. The high-quality format is of one of a first type corresponding to the S-VHS recording mode and a second type corresponding to the first or second high-quality recording mode.

The frequency deviation detector 37 outputs a signal to the microcomputer 33 which represents whether the reproduced FM modulated luminance signal has a frequency deviation of 3.4 to 4.4 MHz or 5.4 to 7.0 MHz, that is, whether the reproduced FM modulated luminance signal is of the VHS format or the high-quality format.

As previously mentioned, the microcomputer 33 operates in accordance with a program stored in the internal ROM. According to a segment of the program, the microcomputer 33 selects a desired playback mode of operation of the apparatus from among a VHS playback mode, an S-VHS playback mode, and a high-quality playback mode in response to the output signals of the identification hole detector 35 and the frequency deviation detector 37. Then, the microcomputer 33 determines the characteristics of the signal processing by the reproducing FM equalizer 41, the double limiter 42, the FM demodulation circuit 43, the linear de-emphasis circuit 44a, the low pass filter 45, the nonlinear de-emphasis circuit 44b, and the noise canceller 46 in accordance with the desired playback mode of operation. Thereby, the microcomputer 33 sets an actual playback mode of operation of the apparatus into agreement with the desired playback mode.

The apparatus reproducing side in FIG. 6 operates as follows. When the tape cassette K is placed into the apparatus, the device 35 detects whether an identification hole is present in or absent from the tape casette K. In the presence of an identification hole, the device 35 decides that the magnetic tape in the cassette K is of the S-VHS type. In the absence of an identification hole, the device 35 decides that the magnetic tape in the cassette K is of the VHS type.

The identification hole detector 35 outputs a signal to the microcomputer 33 which represents whether the magnetic tape in the cassette K is of the VHS type or the S-VHS type.

When the apparatus reproducing side in FIG. 6 starts to operate in response to user's requirement, a signal is reproduced from the magnetic tape in the cassette K. The reproduced signal is transmitted to the frequency deviation detector 37 via the reproducing amplifier 36, the high pass filter 40, and the reproducing FM equalizer 41. The device 37 detects whether the reproduced signal has a frequency deviation of 3.4 to 4.4 MHz or 5.4 to 7.0 MHz. In other words, the device 37 detects whether the reproduced FM modulated luminance signal is of the VHS format or the high-quality format. The frequency deviation detector 37 outputs a signal to the microcomputer 33 which represents whether the reproduced signal has a frequency deviation of 3.4 to 4.4 MHz or 5.4 to 7.0 MHz, that is, whether the reproduced signal is of the VHS format or the high-quality format.

The microcomputer 33 determines a playback mode of operation of the apparatus in response to the output signals of the identification hole detector 35 and the frequency deviation detector 37. Specifically, the microcomputer 33 sets operation of the apparatus to a VHS playback mode in the case where the output signal of the identification hole detector 35 represents that the magnetic tape in the cassette K is of the VHS type while the output signal of the frequency deviation detector 37 represents that the reproduced signal is of the VHS format. The microcomputer 33 sets operation of the apparatus to a high-quality playback mode in the case where the output signal of the identification hole detector 35 represents that the magnetic tape in the cassette K is of the VHS type while the output signal of the frequency deviation detector 37 represents that the reproduced signal is of the high-quality format.

The microcomputer 33 sets operation of the apparatus to an S-VHS playback mode in the case where the output signal of the identification hole detector 35 represents that the magnetic tape in the cassette K is of the S-VHS type while the output signal of the frequency deviation detector 37 represents that the reproduced signal is of the high-quality format.

During the VHS playback mode of operation, the microcomputer 33 sets the characteristics of the signal processing by the reproducing FM equalizer 41, the double limiter 42, the FM demodulation circuit 43, the linear de-emphasis circuit 44a, the low pass filter 45, the nonlinear de-emphasis circuit 44b, and the noise canceller 46 into line with the reproduction of a VHS video signal from a VHS tape.

During the S-VHS playback mode of operation, the microcomputer 33 sets the characteristics of the signal processing by the reproducing FM equalizer 41, the double limiter 42, the FM demodulation circuit 43, the linear de-emphasis circuit 44a, the low pass filter 45, the nonlinear de-emphasis circuit 44b, and the noise canceller 46 into line with the reproduction of an S-VHS video signal from an S-VHS tape.

During the high-quality playback mode of operation, the microcomputer 33 sets the characteristics of the signal processing by the reproducing FM equalizer 41, the linear de-emphasis circuit 44a, the nonlinear de-emphasis circuit 44b, and the noise canceller 46 into line with the reproduction of a high-quality video signal from a VHS tape corresponding to the intermediate level "2" or the highest level "3". During the high-quality playback mode of operation, the microcomputer 33 sets the characteristics of the signal processing by the double limiter 42, the FM demodulation circuit 43, and the low pass filter 45 into line with the reproduction of an S-VHS video signal from an S-VHS tape. It should be noted that the microcomputer 33 may set the characteristics of the signal processing by the high pass filter 40 into line with the reproduction of an S-VHS video signal from an S-VHS tape.

Figure 7:
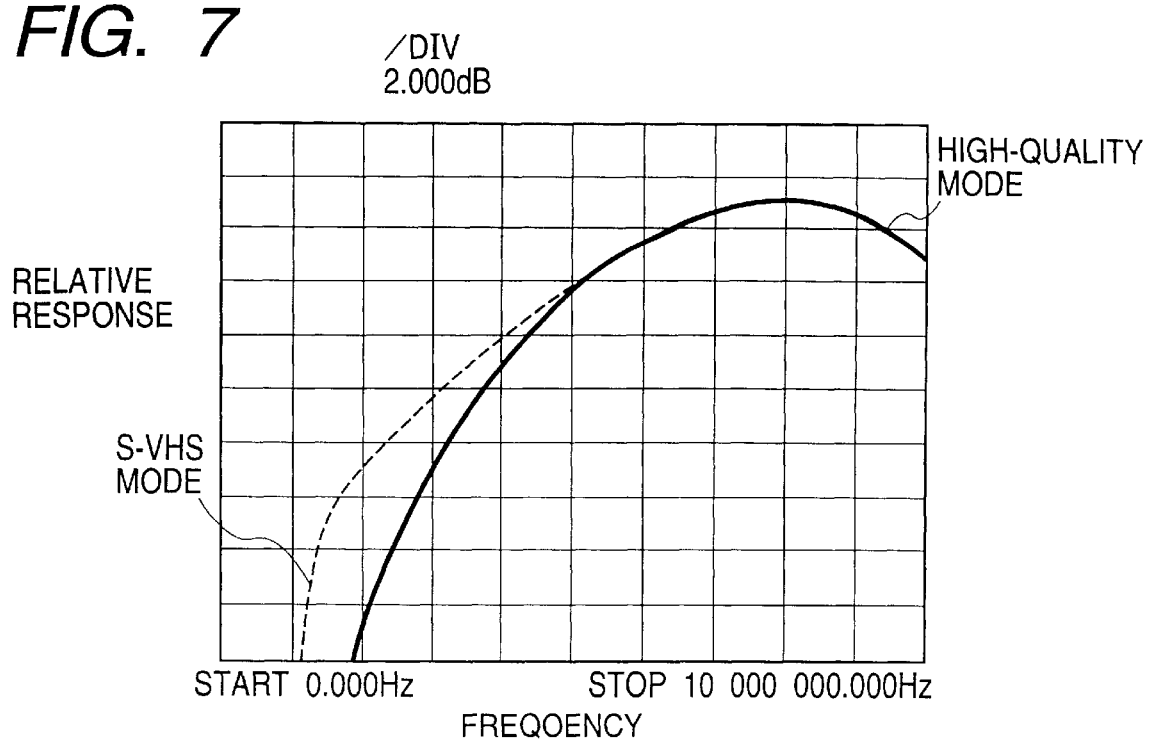
FIG. 7 is a diagram of a first example of the changeable frequency response of a reproducing FM equalizer in the apparatus reproducing side of FIG. 6.

The frequency response of the reproducing FM equalizer 41 can be changed among first, second, and third types. The frequency response of the reproducing FM equalizer 41 is set to the first type during the VHS playback mode of operation. The frequency response of the reproducing FM equalizer 41 is set to the second type during the S-VHS playback mode of operation. The frequency response of the reproducing FM equalizer 41 is set to the third type during the high-quality playback mode of operation. As shown in FIG. 7, the frequency response of the third type (the high-quality type) suppresses the emphasis of a low-frequency side band in comparison with the frequency response of the second type (the S-VHS type).

Figure 8:
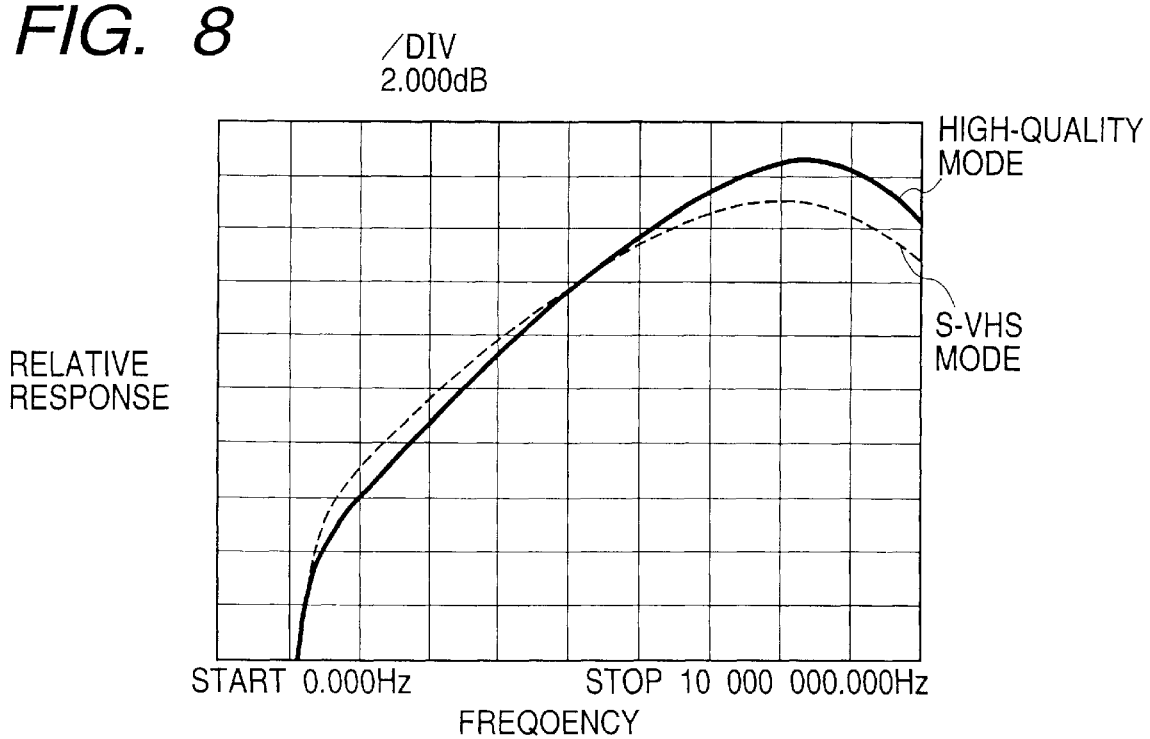
FIG. 8 is a diagram of a second example of the changeable frequency response of the reproducing FM equalizer in the apparatus reproducing side of FIG. 6.

Regarding the reproducing FM equalizer 41, the frequency response of the third type (the high-quality type) and the frequency response of the second type (the S-VHS type) may be modified as follows. As shown in FIG. 8, the frequency response of the third type (the high-quality type) provides enhanced Q in the peaking characteristics to relatively suppress the emphasis of a low-frequency side band in comparison with the frequency response of the second type (the S-VHS type).

According to the above-mentioned change in the frequency response of the reproducing FM equalizer 41, the degree of a surplus against the occurrence of luminance reversal during the high-quality playback mode of operation can be similar to that provided during the S-VHS playback mode of operation.

Operation of the composite de-emphasis circuit 44 is inverse with respect to operation of the pre-emphasis circuit 12 in the apparatus recording section of FIG. 1. Specifically, the composite de-emphasis circuit 44 cancels the emphasis of high-frequency signal components which is provided by the pre-emphasis circuit 12. In addition, the composite de-emphasis circuit 44 implements correction of the total frequency characteristics and the pulse characteristics.

Figure 9:
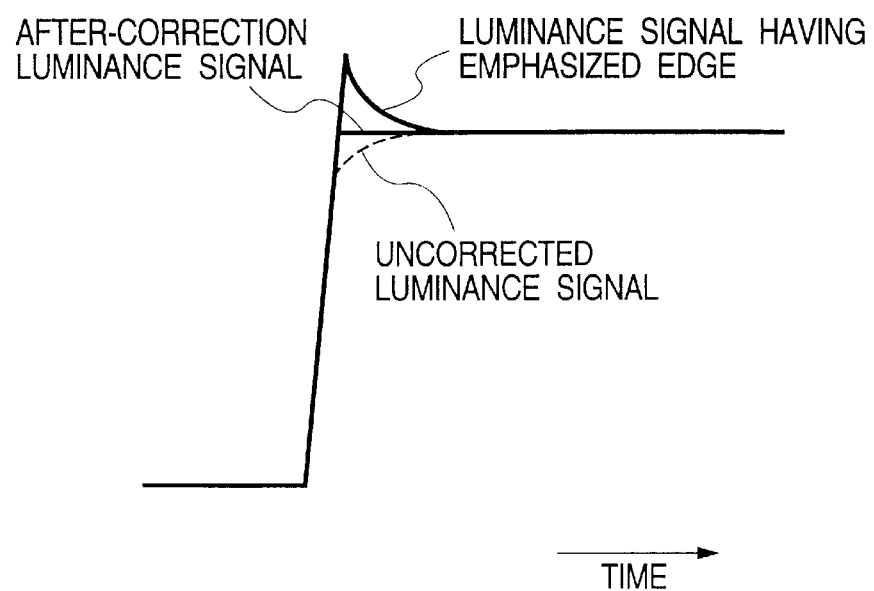
FIG. 9 is a time-domain diagram of the waveforms of reproduced luminance signals which include rising edges.

Generally, the suppression of the white clip level during a recording mode of operation would cause a blunt rising edge in the waveform of a reproduced luminance signal as shown in FIG. 9. During the high-quality playback mode of operation, since a VHS tape different from an S-VHS tape is used, the frequency spectrum of a reproduced luminance signal would differ from that of a luminance signal reproduced in the S-VHS playback mode of operation.

During the high-quality playback mode of operation, the composite de-emphasis circuit 44 compensates for the above-mentioned blunt rising edge in the waveform of a reproduced luminance signal. In addition, the composite de-emphasis circuit 44 compensates for a VHS-tape-caused change in the frequency spectrum of a reproduced luminance signal. Accordingly, as shown in FIG. 9, the compensation-resultant signal, that is, the reproduced luminance signal outputted from the composite de-emphasis circuit 44 has a sharp rising edge. It should be noted that the above-mentioned compensations may be designed to provide a sharper rising edge.

Figure 10:
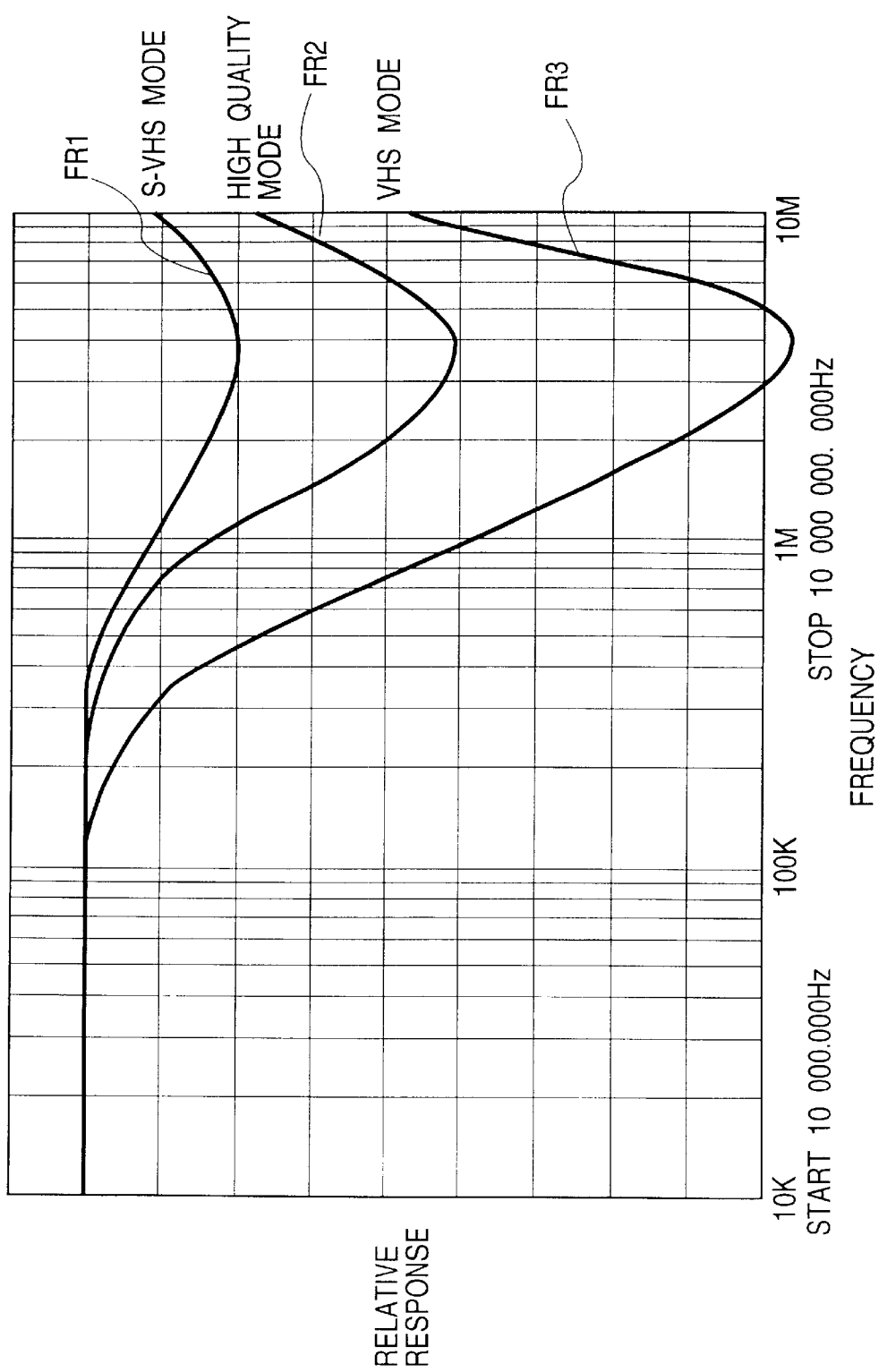
FIG. 10 is a diagram of the changeable frequency response of a noise canceller in the apparatus reproducing side of FIG. 6.

The noise canceller 46 is designed to remove high-frequency noise from the output signal of the composite de-emphasis circuit 44. The frequency response of the noise canceller 46 can be changed among a first type FR1, a second type FR2, and a third type FR3 shown in FIG. 10. The first type FR1 is selected during the S-VHS playback mode of operation. The second type FR2 is selected during the high-quality playback mode of operation. The third type FR3 is selected during the VHS playback mode of operation. As shown in FIG. 10, the second type FR2 (the high-quality type) provides a stronger noise cancel effect than that provided by the first type FR1 (the S-VHS type).

A luminance noise reduction circuit using a 1H delay line or a 3-dimensional luminance noise reduction circuit using a field memory may be designed to provide a stronger noise reduction effect during the high-quality playback mode of operation than that provided during the S-VHS playback mode of operation. A chrominance noise reduction circuit using a 1H delay line or a 3-dimensional chrominance noise reduction circuit using a field memory may be designed to provide a stronger noise reduction effect during the high-quality playback mode of operation than that provided during the S-VHS playback mode of operation.

It should be noted that the recording side may be omitted from the magnetic recording and reproducing apparatus in the first embodiment of this invention.

Second Embodiment

A magnetic recording and reproducing apparatus according to a second embodiment of this invention is divided into a recording side and a reproducing side. The magnetic recording and reproducing apparatus is also referred to as the apparatus. First, the recording side of the apparatus will be explained hereinafter.

Figure 11:
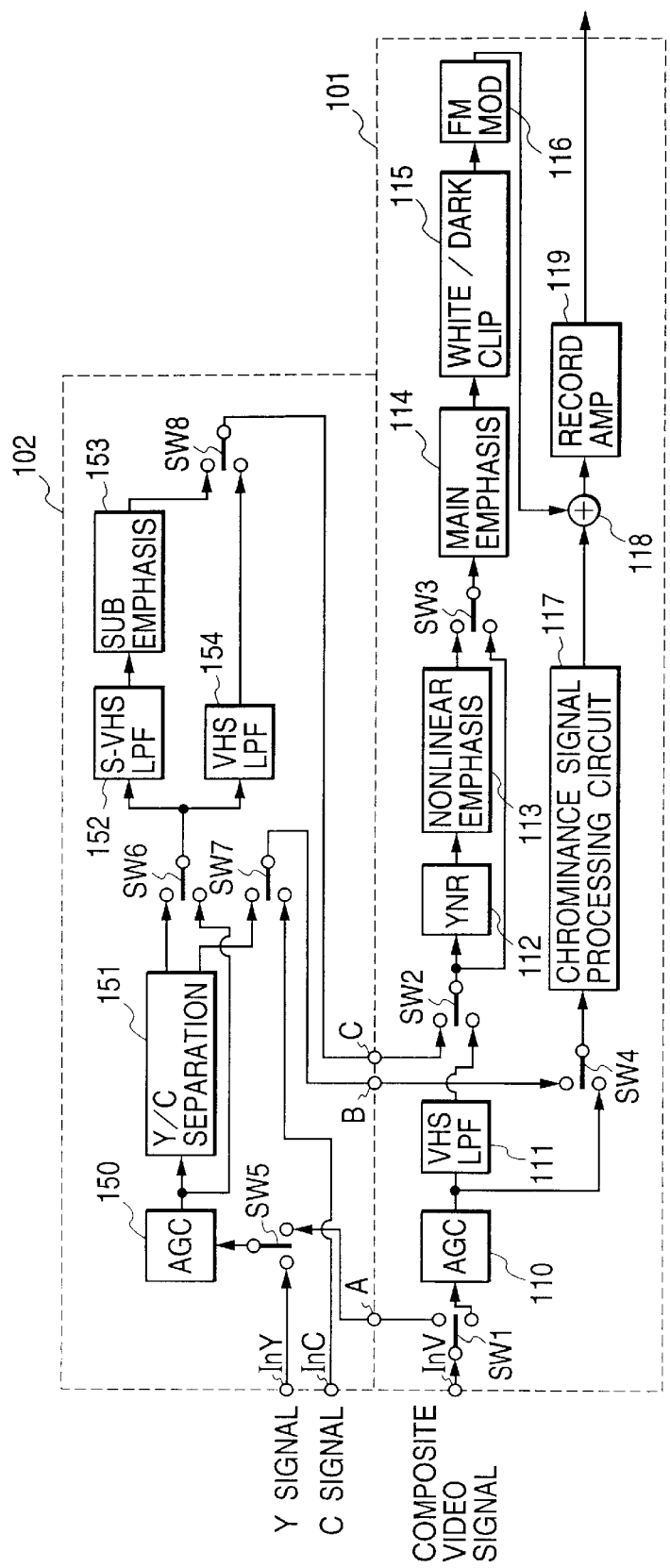
FIG. 11 is a block diagram of a recording side of a magnetic recording and reproducing apparatus according to a second embodiment of this invention.

As shown in FIG. 11, the recording side of the apparatus includes a VHS signal recording circuit 101. An S-VHS signal recording circuit 102 can be connected to the VHS signal recording circuit 101. The VHS signal recording circuit 101 and the S-VHS signal recording circuit 102 are provided on separate printed circuit boards, respectively. The S-VHS signal recording circuit 102 may be omitted from the recording side of the apparatus. In the absence of the S-VHS signal recording circuit 102, the recording side of the apparatus is able to implement the processing of a VHS video signal. On the other hand, in the presence of the S-VHS signal recording circuit 102, the recording side of the apparatus is able to implement the processing of a VHS video signal and also the processing of an S-VHS video signal.

As shown in FIG. 11, the VHS signal recording circuit 101 includes a switch SW1 and an AGC circuit 110. The switch SW1 is connected among an input terminal InV, the AGC circuit 110, and a connection point "A". The connection point "A" is provided between the VHS signal recording circuit 101 and the S-VHS signal recording circuit 102. A composite video signal is applied to the switch SW1 via the input terminal InV. The switch SW1 transmits the composite video signal to either the AGC circuit 110 or the connection point "A".

The AGC circuit 110 automatically adjusts the level of the composite video signal at a suitable level. In the VHS signal recording circuit 101, the AGC circuit 110 is followed by a low pass filter (LPF) 111 and a switch SW4. The AGC circuit 110 outputs the level-adjustment-resultant video signal to the low pass filter 111 and the switch SW4. The low pass filter 111 extracts a luminance signal from the output signal of the AGC circuit 110. The cutoff frequency of the low pass filter 111 is set to 3 MHz.

The VHS signal recording circuit 101 includes switches SW2 and SW3, a luminance noise reduction circuit 112, and a nonlinear emphasis circuit 113. The switch SW2 is connected among the low pass filter 111, a connection point "C", the luminance noise reduction circuit 112, and the switch SW3. The connection point "C" is provided between the VHS signal recording circuit 101 and the S-VHS signal recording circuit 102. The low pass filter 111 outputs the luminance signal to the switch SW2. A luminance signal can be transmitted from the S-VHS signal recording circuit 102 to the switch SW2 via the connection point "C". The switch SW2 selects one of the luminance signal from the low pass filter 111 and the luminance signal from the S-VHS signal recording circuit 102, and transmits the selected luminance signal to the luminance noise reduction circuit 112 and the switch SW3.

The luminance noise reduction circuit 112 is connected to the nonlinear emphasis circuit 113. The nonlinear emphasis circuit 113 is connected to the switch SW3. The luminance noise reduction circuit 112 emphasizes vertical-direction high-frequency components of the received luminance signal in response to the level thereof to enhance the luminance S/N ratio. The luminance noise reduction circuit 112 outputs the resultant luminance signal to the nonlinear emphasis circuit 113. The nonlinear emphasis circuit 113 emphasizes high-frequency components of the output signal of the luminance noise reduction circuit 112 in response to the level thereof to further enhance the luminance S/N ratio. The nonlinear emphasis circuit 113 outputs the resultant luminance signal to the switch SW3.

In the VHS signal recording circuit 101, the switch SW3 is connected among the switch SW2, the nonlinear emphasis circuit 113, and a main emphasis circuit 114. The main emphasis circuit 114 is successively followed by a white/dark clip circuit 115 and an FM modulation circuit 116. The switch SW3 selects one of the luminance signal from the switch SW2 and the luminance signal from the nonlinear emphasis circuit 113, and transmits the selected luminance signal to the main emphasis circuit 114.

The main emphasis circuit 114 emphasizes high-frequency components of the received luminance signal independent of the level thereof to further enhance the luminance S/N ratio. The main emphasis circuit 114 outputs the resultant luminance signal to the white/dark clip circuit 115. The white/dark clip circuit 115 removes sharp-spike components from rising and falling edges in the output signal of the main emphasis circuit 114 to prevent the occurrence of luminance reversal. The white/dark clip circuit 115 outputs the resultant luminance signal to the FM modulation circuit 116. The FM modulation circuit 116 subjects the output signal of the white/dark clip circuit 115 to frequency modulation, thereby converting the output signal of the white/dark clip circuit 115 into an FM modulated luminance signal. The FM modulation circuit 116 outputs the FM modulated luminance signal.

The VHS signal recording circuit 101 includes a chrominance signal processing circuit 117, an adder 118, and a recording amplifier 119. The switch SW4 is connected among the AGC circuit 110, a connection point "B", and the chrominance signal processing circuit 117. The connection point "B" is provided between the VHS signal recording circuit 101 and the S-VHS signal recording circuit 102. A color signal can be transmitted from the S-VHS signal recording circuit 102 to the switch SW4 via the connection point "B". The switch SW4 selects one of the video signal from the AGC circuit 110 and the color signal from the S-VHS signal recording circuit 102, and transmits the selected signal to the chrominance signal processing circuit 117. The chrominance signal processing circuit 117 extracts components from the received signal which have frequencies in a given band assigned to chrominance. In other words, the chrominance signal processing circuit 117 extracts chrominance components from the received signal. The chrominance signal processing circuit 117 implements frequency down conversion of the chrominance components, and thereby generates frequency-down-converted chrominance signals. The chrominance signal processing circuit 117 outputs the frequency. down-converted chrominance signals.

The adder 118 receives the FM modulated luminance signal from the FM modulation circuit 116. The adder 118 receives the frequency-down-converted chrominance signals from the chrominance signal processing circuit 117. The adder 118 multiplexes or combines the FM modulated luminance signal and the frequency-down-converted chrominance signals into a composite video signal on a frequency division basis. The adder 118 outputs the composite video signal to a recording current equalizer (not shown in FIG. 11). The recording current equalizer processes the output signal of the adder 118 to compensate for variations in frequency response characteristics of parts including magnetic heads. The recording current equalizer outputs the resultant video signal to the recording amplifier 119. The recording amplifier 119 enlarges the output signal of the recording current equalizer to a level suited to signal recording on a magnetic tape. The recording amplifier 119 outputs the resultant video signal. The output signal of the recording amplifier 119 is transmitted via rotary transformers to magnetic heads before being recorded on the magnetic tape by the magnetic heads.

In the absence of the S-VHS signal recording circuit 102, the switch SW1 is fixed to a position at which the AGC circuit 110 is connected to the input terminal InV, and the switch SW2 is fixed to a position at which the luminance noise reduction circuit 112 is connected to the low pass filter 111. In addition, the switch SW3 is fixed to a position at which the main emphasis circuit 114 is connected to the nonlinear emphasis circuit 113, and the switch SW4 is fixed to a position at which the chrominance signal processing circuit 117 is connected to the AGC circuit 110.

In the absence of the S-VHS signal recording circuit 102, the composite video signal fed via the input terminal InV is processed by the AGC circuit 110. The output signal of the AGC circuit 110 is processed into the luminance signal by the low pass filter 111. The luminance signal is successively processed by the luminance noise reduction circuit 112, the nonlinear emphasis circuit 113, the main emphasis circuit 114, the white/dark clip circuit 115, and the FM modulation circuit 116. On the other hand, the output signal of the AGC circuit 110 is processed into the frequency-down-converted chrominance signals by the chrominance signal processing circuit 117.

The combination of the VHS signal recording circuit 101 and the S-VHS signal recording circuit 102 is able to implement the processing of an S-VHS video signal in addition to the processing of a VHS video signal. As shown in FIG. 11, the S-VHS signal recording circuit 102 includes switches SW5, SW6, SW7, and SW8, an AGC circuit 150, a Y/C separation circuit 151, a low pass filter (LPF) 152, a sub emphasis circuit 153, and a low pass filter (LPF) 154.

The switch SW5 is connected among an input terminal InY, the connection point "A", and the AGC circuit 150. A luminance signal is applied to the switch SW5 via the input terminal InY. A composite video signal can be transmitted from the VHS signal recording circuit 101 to the switch SW5 via the connection point "A". The switch SW5 selects one of the luminance signal from the input terminal InY and the composite video signal from the VHS signal recording circuit 101, and transmits the selected signal to the AGC circuit 150. The AGC circuit 150 automatically adjusts the level of the signal from the switch SW5 at a suitable level. In the S-VHS signal recording circuit 102, the AGC circuit 150 is followed by the Y/C separation circuit 151 and the switch SW6. The AGC circuit 150 outputs the level-adjustment-resultant video signal to the Y/C separation circuit 151 and the switch SW6. The Y/C separation circuit 151 divides the output signal of the AGC circuit 150 into a luminance signal and a color signal.

In the S-VHS signal recording circuit 102, the switch SW6 is connected among the AGC circuit 150, the Y/C separation circuit 151, and the low pass filters 152 and 154. The Y/C separation circuit 151 outputs the luminance signal to the switch SW6. On the other hand, the luminance signal fed via the input terminal InY is transmitted to the switch SW6 via the switch SW5 and the AGC circuit 150. The switch SW6 selects one of the luminance signal from the Y/C separation circuit 151 and the luminance signal from the AGC circuit 150, and transmits the selected luminance signal to the low pass filters 152 and 154.

The low pass filter 152 processes the received luminance signal with a cutoff frequency of 5 MHz which matches with an S-VHS video signal. The low pass filter 152 is followed by the sub emphasis circuit 153. The low pass filter 152 outputs the processing-resultant luminance signal to the sub emphasis circuit 153. The sub emphasis circuit 153 emphasizes high-frequency components of the luminance signal to enhance the luminance S/N. The sub emphasis circuit 153 outputs the resultant luminance signal.

The low pass filter 154 processes the received luminance signal with a cutoff frequency of 4 MHz or lower which matches with a VHS video signal. The low pass filter 154 outputs the processing-resultant luminance signal.

The switch SW8 is connected among the sub emphasis circuit 153, the low pass filter 154, and the connection point "C". The switch SW8 receives the luminance signal from the sub emphasis circuit 153. The switch SW8 receives the luminance signal from the low pass filter 154. The switch SW8 selects one of the luminance signal from the sub emphasis circuit 153 and the luminance signal from the low pass filter 154, and transmits the selected luminance signal to the VHS signal recording circuit 101 via the connection point "C".

The switch SW7 is connected among an input terminal InC, the Y/C separation circuit 151, and the connection point "B". A color signal is applied to the switch SW7 via the input terminal InC. The Y/C separation circuit 151 outputs the color signal to the switch SW7. The switch SW7 selects one of the color signal from the input terminal InC and the color signal from the Y/C separation circuit 151, and transmits the selected color signal to the VHS signal recording circuit 101 via the connection terminal "B".

In the presence of the S-VHS signal recording circuit 102, the composite video signal is transmitted from the switch SW1 in the VHS signal recording circuit 101 to the switch SW5 in the S-VHS signal recording circuit 102 via the connection point "A". In addition, the luminance signal is transmitted from the switch SW8 in the S-VHS signal recording circuit 102 to the switch SW2 in the VHS signal recording circuit 101 via the connection point "C". Furthermore, the color signal is transmitted from the switch SW7 in the S-VHS signal recording circuit 102 to the switch SW4 in the VHS signal recording circuit 101 via the connection point "B".

In the presence of the S-VHS signal recording circuit 102, the recording side of the apparatus is able to implement the processing of a VHS video signal and also the processing of an S-VHS video signal. The recording side of the apparatus can handle the composite video signal fed via the input terminal InV, and also the component video signals, that is, the luminance signal and the color signal fed via the input terminals InY and InC.

In the presence of the S-VHS signal recording circuit 102, the recording side of the apparatus operates in a mode which can be changed among a composite VHS mode, a component VHS mode, a composite S-VHS mode, and a component S-VHS mode.

During the composite VHS mode of operation, the switch SW1 in the VHS signal recording circuit 101 is fixed to a position at which a VHS composite video signal is transmitted from the input terminal InV to the switch SW5 in the S-VHS signal recording circuit 102 via the connection point "A". The switch SW2 in the VHS signal recording circuit 101 is fixed to a position at which the luminance signal is transmitted from the switch SW8 in the S-VHS signal recording circuit 102 to the luminance noise reduction circuit 112 in the VHS signal recording circuit 101 via the connection point "C". The switch SW3 in the VHS signal recording circuit 101 is fixed to a position at which the main emphasis circuit 114 is connected to the nonlinear emphasis circuit 113. The switch SW4 in the VHS signal recording circuit 101 is fixed to a position at which the color signal is transmitted from the switch SW7 in the S-VHS signal recording circuit 102 to the chrominance signal processing circuit 117 in the VHS signal recording circuit 101 via the connection point "B". The switch SW5 in the S-VHS signal recording circuit 102 is fixed to a position at which the composite video signal is transmitted from the switch SW1 in the S-VHS signal recording circuit 101 to the AGC circuit 150 in the S-VHS signal recording circuit 102. The switch SW6 in the S-VHS signal recording circuit 102 is fixed to a position at which the low pass filters 152 and 154 are connected to the Y/C separation circuit 151. The switch SW7 in the S-VHS signal recording circuit 102 is fixed to a position at which the color signal is transmitted from the Y/C separation circuit 151 in the S-VHS signal recording circuit 102 to the switch SW4 in the VHS signal recording circuit 101 via the connection point "B". The switch SW8 in the S-VHS signal recording circuit 102 is fixed to a position at which the luminance signal is transmitted from the low pass filter 154 to the switch SW2 in the VHS signal recording side 101 via the connection point "C".

During the composite VHS mode of operation, a VHS composite video signal fed via the input terminal InV is transmitted to the AGC circuit 150 via the switches SW1 and SW5. The composite video signal is successively processed by the AGC circuit 150 and the Y/C separation circuit 151. The composite video signal is divided into the luminance signal and the color signal by the Y/C separation circuit 151. The luminance signal is transmitted from the Y/C separation circuit 151 to the low pass filter 154 via the switch SW6. The luminance signal is processed by the low pass filter 154. The processing-resultant luminance signal is transmitted from the low pass filter 154 to the luminance noise reduction circuit 112 via the switches SW8 and SW2. The luminance signal is successively processed by the luminance noise reduction circuit 112 and the nonlinear emphasis circuit 113. The resultant luminance signal, that is, the output signal of the nonlinear emphasis circuit 113, is transmitted to the main emphasis circuit 114 via the switch SW3. The luminance signal is successively processed by the main emphasis circuit 114, the white/dark clip circuit 115, and the FM modulation circuit 116. On the other hand, the color signal is transmitted from the Y/C separation circuit 151 to the chrominance signal processing circuit 117 via the switches SW7 and the SW4.

The color signal is processed by the chrominance signal processing circuit 117.

During the component VHS mode of operation, the switch SW1 in the VHS signal recording circuit 101 is fixed to the position at which the connection point "A" is connected to the input terminal InV. The switch SW2 in the VHS signal recording circuit 101 is fixed to the position at which the luminance signal is transmitted from the switch SW8 in the S-VHS signal recording circuit 102 to the luminance noise reduction circuit 112 in the VHS signal recording circuit 101 via the connection point "C". The switch SW3 in the VHS signal recording circuit 101 is fixed to the position at which the main emphasis circuit 114 is connected to the nonlinear emphasis circuit 113. The switch SW4 in the VHS signal recording circuit 101 is fixed to the position at which the color signal is transmitted from the switch SW7 in the S-VHS signal recording circuit 102 to the chrominance signal processing circuit 117 in the VHS signal recording circuit 101 via the connection point "B". The switch SW5 in the S-VHS signal recording circuit 102 is fixed to a position at which a VHS luminance signal is transmitted from the input terminal InY to the AGC circuit 150 in the S-VHS signal recording circuit 102. The switch SW6 in the S-VHS signal recording circuit 102 is fixed to a position at which the low pass filters 152 and 154 are connected to the AGC circuit 150 in the S-VHS signal recording circuit 102. The switch SW7 in the S-VHS signal recording circuit 102 is fixed to a position at which a VHS color signal is transmitted from the input terminal InC to the switch SW4 in the VHS signal recording circuit 101 via the connection point "B". The switch SW8 in the S-VHS signal recording circuit 102 is fixed to the position at which the luminance signal is transmitted from the low pass filter 154 to the switch SW2 in the VHS signal recording side 101 via the connection point "C".

During the component VHS mode of operation, a VHS luminance signal fed via the input terminal InY is transmitted to the AGC circuit 150 via the switch SW5. The luminance signal is processed by the AGC circuit 150. The resultant luminance signal is transmitted from the AGC circuit 150 to the low pass filter 154 via the switch SW6. The luminance signal is processed by the low pass filter 154. The processing-resultant luminance signal is transmitted from the low pass filter 154 to the luminance noise reduction circuit 112 via the switches SW8 and SW2. The luminance signal is successively processed by the luminance noise reduction circuit 112 and the nonlinear emphasis circuit 113. The resultant luminance signal, that is, the output signal of the nonlinear emphasis circuit 113, is transmitted to the main emphasis circuit 114 via the switch SW3. The luminance signal is successively processed by the main emphasis circuit 114, the white/dark clip circuit 115, and the FM modulation circuit 116. On the other hand, a VHS color signal fed via the input terminal InC is transmitted to the chrominance signal processing circuit 117 via the switches SW7 and the SW4. The color signal is processed by the chrominance signal processing circuit 117.

During the composite S-VHS mode of operation, the switch SW1 in the VHS signal recording circuit 101 is fixed to the position at which an S-VHS composite video signal is transmitted from the input terminal InV to the switch SW5 in the S-VHS signal recording circuit 102 via the connection point "A". The switch SW2 in the VHS signal recording circuit 101 is fixed to the position at which the luminance signal is transmitted from the switch SW8 in the S-VHS signal recording circuit 102 to the switch SW3 in the VHS signal recording circuit 101 via the connection point "C". The switch SW3 in the VHS signal recording circuit 101 is fixed to a position at which the main emphasis circuit 114 is connected to the switch SW2. The switch SW4 in the VHS signal recording circuit 101 is fixed to the position at which the color signal is transmitted from the switch SW7 in the S-VHS signal recording circuit 102 to the chrominance signal processing circuit 117 in the VHS signal recording circuit 101 via the connection point "B". The switch SW5 in the S-VHS signal recording circuit 102 is fixed to the position at which the composite video signal is transmitted from the switch SW1 in the VHS signal recording circuit 101 to the AGC circuit 150 in the S-VHS signal recording circuit 102. The switch SW6 in the S-VHS signal recording circuit 102 is fixed to the position at which the low pass filters 152 and 154 are connected to the Y/C separation circuit 151. The switch SW7 in the S-VHS signal recording circuit 102 is fixed to the position at which the color signal is transmitted from the Y/C separation circuit 151 in the S-VHS signal recording circuit 102 to the switch SW4 in the VHS signal recording circuit 101 via the connection point "B". The switch SW8 in the S-VHS signal recording circuit 102 is fixed to a position at which the luminance signal is transmitted from the sub emphasis circuit 153 to the switch SW2 in the VHS signal recording side 101 via the connection point "C".

During the composite S-VHS mode of operation, an S-VHS composite video signal fed via the input terminal InV is transmitted to the AGC circuit 150 via the switches SW1 and SW5. The composite video signal is successively processed by the AGC circuit 150 and the Y/C separation circuit 151. The composite video signal is divided into the luminance signal and the color signal by the Y/C separation circuit 151. The luminance signal is transmitted from the Y/C separation circuit 151 to the low pass filter 152 via the switch SW6. The luminance signal is successively processed by the low pass filter 152 and the sub emphasis circuit 153. The processing-resultant luminance signal is transmitted from the sub emphasis circuit 153 to the main emphasis circuit 114 via the switches SW8, SW2, and SW3. The luminance signal is successively processed by the main emphasis circuit 114, the white/dark clip circuit 115, and the FM modulation circuit 116. On the other hand, the color signal is transmitted from the Y/C separation circuit 151 to the chrominance signal processing circuit 117 via the switches SW7 and the SW4. The color signal is processed by the chrominance signal processing circuit 117. During the component S-VHS mode of operation, the switch SW1 in the VHS signal recording circuit 101 is fixed to the position at which the connection point "A" is connected to the input terminal InV. The switch SW2 in the VHS signal recording circuit 101 is fixed to the position at which the luminance signal is transmitted from the switch SW8 in the S-VHS signal recording circuit 102 to the switch SW3 in the VHS signal recording circuit 101 via the connection point "C". The switch SW3 in the VHS signal recording circuit 101 is fixed to the position at which the main emphasis circuit 114 is connected to the switch SW2. The switch SW4 in the VHS signal recording circuit 101 is fixed to the position at which the color signal is transmitted from the switch SW7 in the S-VHS signal recording circuit 102 to the chrominance signal processing circuit 117 in the VHS signal recording circuit 101 via the connection point "B". The switch SW5 in the S-VHS signal recording circuit 102 is fixed to the position at which an S-VHS luminance signal is transmitted from the input terminal InY to the AGC circuit 150 in the S-VHS signal recording circuit 102. The switch SW6 in the S-VHS signal recording circuit 102 is fixed to the position at which the low pass filters 152 and 154 are connected to the AGC circuit 150 in the S-VHS signal recording circuit 102. The switch SW7 in the S-VHS signal recording circuit 102 is fixed to the position at which an S-VHS color signal is transmitted from the input terminal InC to the switch SW4 in the VHS signal recording circuit 101 via the connection point "B". The switch SW8 in the S-VHS signal recording circuit 102 is fixed to the position at which the luminance signal is transmitted from the sub emphasis circuit 153 to the switch SW2 in the VHS signal recording side 101 via the connection point "C".

During the component S-VHS mode of operation, an S-VHS luminance signal fed via the input terminal InY is transmitted to the AGC circuit 150 via the switch SW5. The luminance signal is processed by the AGC circuit 150. The resultant luminance signal is transmitted from the AGC circuit 150 to the low pass filter 152 via the switch SW6. The luminance signal is successively processed by the low pass filter 152 and the sub emphasis circuit 153. The processing-resultant luminance signal is transmitted from the sub emphasis circuit 153 to the main emphasis circuit 114 via the switches SW8, SW2, and SW3. The luminance signal is successively processed by the main emphasis circuit 114, the white/dark clip circuit 115, and the FM modulation circuit 116. On the other hand, an S-VHS color signal fed via the input terminal InC is transmitted to the chrominance signal processing circuit 117 via the switches SW7 and the SW4. The color signal is processed by the chrominance signal processing circuit 117.

During the composite VHS mode of operation, the component VHS mode of operation, the composite S-VHS mode of operation, and the component S-VHS mode of operation, the FM modulation circuit 116 outputs the FM modulated luminance signal to the adder 118. On the other hand, the chrominance signal processing circuit 117 outputs the frequency-down-converted chrominance signals to the adder 118. The adder 118 multiplexes or combines the FM modulated luminance signal and the frequency-down-converted chrominance signals into the composite video signal on the frequency division basis. The adder 118 outputs the composite video signal to the recording current equalizer (not shown in FIG. 11). The recording current equalizer processes the output signal of the adder 118, and outputs the resultant video signal to the recording amplifier 119. The recording amplifier 119 enlarges the output signal of the recording current equalizer to the level suited to the signal recording on the magnetic tape. The recording amplifier 119 outputs the resultant video signal. The output signal of the recording amplifier 119 is transmitted via the rotary transformers to the magnetic heads before being recorded on the magnetic tape by the magnetic heads.

Preferably, the passband width of the VHS low pass filter 154 in the S-VHS signal recording circuit 102 is slightly greater than that of the low pass filter 111 in the VHS signal recording circuit 101.

Figure 12:
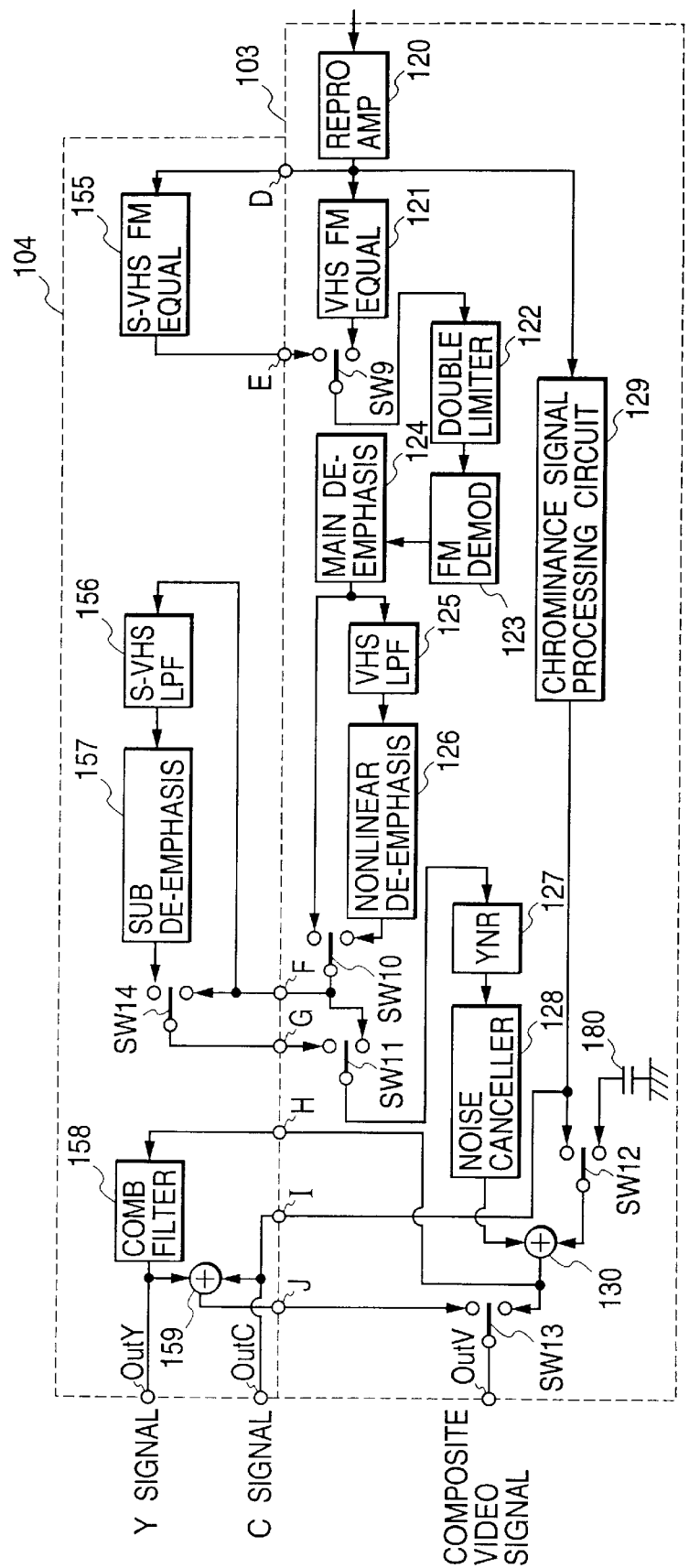
FIG. 12 is a block diagram of a reproducing side of the magnetic recording and reproducing apparatus according to the second embodiment of this invention.

Preferably, the AGC circuit 150 is followed by a sync separation circuit (not shown). The sync separation circuit generates a sync signal from the output signal of the AGC circuit 150. Furthermore, the sync separation circuit generates a keyed pulse signal in response to the sync signal. The AGC circuit 150 implements gain control in response to the keyed pulse signal. Preferably, a suitable circuit (not shown) generates a gate pulse signal in response to the output signals of the Y/C separation circuit 151. The gate pulse signal is used by the chrominance signal processing circuit 117. The reproducing side of the apparatus will be explained hereinafter. As shown in FIG. 12, the reproducing side of the apparatus includes a VHS signal reproducing circuit 103. An S-VHS signal reproducing circuit 104 can be connected to the VHS signal reproducing circuit 103. The VHS signal reproducing circuit 103 and the S-VHS signal reproducing circuit 104 are provided on separate printed circuit boards, respectively.

The S-VHS signal reproducing circuit 104 may be omitted from the reproducing side of the apparatus. In the absence of the S-VHS signal reproducing circuit 104, the reproducing side of the apparatus is able to implement the processing of a VHS video signal. On the other hand, in the presence of the S-VHS signal reproducing circuit 104, the reproducing side of the apparatus is able to implement the processing of a VHS video signal and also the processing of an S-VHS video signal.

As shown in FIG. 12, the VHS signal reproducing circuit 103 includes a reproducing amplifier 120, an FM equalizer 121, and a switch SW9. The reproducing amplifier 120 is connected to the FM equalizer 121, a connection point "D", and a chrominance signal processing circuit 129. The connection point "D" is provided between the VHS signal reproducing circuit 103 and the S-VHS signal reproducing circuit 104. The chrominance signal processing circuit 129 is provided in the VHS signal reproducing circuit 103.

During playback, a signal is reproduced from a magnetic tape by magnetic heads, and the reproduced signal is transmitted to the reproducing amplifier 120 via rotary transformers. The reproducing amplifier 120 enlarges the reproduced signal to a given level. The reproducing amplifier 120 outputs the resultant signal to the FM equalizer 121, the connection point "D", and the chrominance signal processing circuit 129. The FM equalizer 121 subjects the output signal of the reproducing amplifier 120 to an equalization process designed to compensate for the group delay characteristic and the frequency response of a tape-head signal transmission arrangement including the magnetic tape and the magnetic heads with respect to a VHS video signal. The FM equalizer 121 outputs the resultant signal. The VHS signal reproducing circuit 103 includes a double limiter 122, an FM demodulation circuit 123, a main de-emphasis circuit 124, a low pass filter (LPF) 125, and a nonlinear de-emphasis circuit 126 which are successively connected in that order. The switch SW9 is connected among the FM equalizer 121, the double limiter 122, and a connection point "E". The connection point "E" is provided between the VHS signal reproducing circuit 103 and the S-VHS signal reproducing circuit 104. In the presence of the S-VHS signal reproducing circuit 104, the switch SW9 can receive a reproduced signal therefrom via the connection point "E". The switch SW9 receives the output signal of the FM equalizer 121. The switch SW9 selects one of the reproduced signal from the S-VHS signal reproducing circuit 104 and the output signal of the FM equalizer 121, and transmits the selected signal to the double limiter 122.

The double limiter 122 separates the signal, fed via the switch SW9, into a high-frequency signal and a low-frequency signal. The double limiter 122 subjects the high-frequency signal and the low-frequency signal to respective limiting processes to prevent the occurrence of luminance reversal. The double limiter 122 outputs the resultant signal to the FM demodulation circuit 123. The FM demodulation circuit 123 recovers a basic reproduced luminance signal from the output signal of the double limiter 122. The FM demodulation circuit 123 outputs the basic reproduced luminance signal to the main de-emphasis circuit 124. The main de-emphasis circuit 124 de-emphasizes high-frequency components of the basic reproduced luminance signal (the output signal of the FM demodulation circuit 123) to improve an S/N ratio in luminance. Operation of the main de-emphasis circuit 124 is inverse with respect to the main emphasis circuit 114 in the recording side of the apparatus. The main de-emphasis circuit 124 outputs the resultant luminance signal. The low pass filter 125 removes a carrier from the output signal of the main de-emphasis circuit 124. The low pass filter 125 outputs the resultant signal to the nonlinear de-emphasis circuit 126. The nonlinear de-emphasis circuit 126 de-emphasizes high-frequency components of the output signal of the low pass filter 125 to further improve the S/N ratio in luminance. Operation of the nonlinear de-emphasis circuit 126 is inverse with respect to the nonlinear emphasis circuit 113 in the recording side of the apparatus.

The VHS signal reproducing circuit 103 includes switches SW10, SW11, SW12, and SW13, a luminance noise reduction circuit 127, a noise canceller 128, and an adder 130. The switch SW10 is connected among the main de-emphasis circuit 124, the nonlinear de-emphasis circuit 126, a connection point "F", and the switch SW11. The connection point "F" is provided between the VHS signal reproducing circuit 103 and the S-VHS signal reproducing circuit 104. The switch SW10 receives the output signal of the main de-emphasis circuit 124. Also, the switch SW10 receives the output signal of the nonlinear de-emphasis circuit 126. The switch SW10 selects one of the output signal of the main de-emphasis circuit 124 and the output signal of the nonlinear de-emphasis circuit 126, and transmits the selected signal to the connection point "F" and the switch SW11.

The switch SW11 is connected among the switch SW10, a connection point "G", and the luminance noise reduction circuit 127. The connection point "G" is provided between the VHS signal reproducing circuit 103 and the S-VHS signal reproducing circuit 104. In the presence of the S-VHS reproducing circuit 104, the switch SW11 receives a luminance signal therefrom via the connection point "G". The switch SW11 receives the luminance signal fed via the switch SW10. The switch SW11 selects one of the luminance signal from the S-VHS reproducing circuit 104 and the luminance signal from the switch SW10, and transmits the selected luminance signal to the luminance noise reduction circuit 127. The luminance noise reduction circuit 127 is followed by the noise canceller 128. The noise canceller 128 is connected to the adder 130. The luminance noise reduction circuit 127 removes noise components from the luminance signal fed via the switch SW11. The luminance noise reduction circuit 127 outputs the resultant luminance signal to the noise canceller 128. The noise canceller 128 removes high-frequency noise components from the output signal of the luminance noise reduction circuit 127. The noise canceller 128 outputs the resultant luminance signal to the adder 130 as a final reproduced luminance signal.

In the VHS signal reproducing circuit 103, the chrominance signal processing circuit 129 subjects the output signal of the reproducing amplifier 120 to frequency up conversion. Thereby, the chrominance signal processing circuit 129 recovers original-frequency chrominance signals from the output signal of the reproducing amplifier 120. The chrominance signal processing circuit 129 outputs the recovered chrominance signals as a final reproduced color signal. The chrominance signal processing circuit 129 is connected to a connection point "I". The connection point "I" is provided between the VHS signal reproducing circuit 103 and the S-VHS signal reproducing circuit 104. The switch SW12 is connected among the chrominance signal processing circuit 129, the adder 130, and one end of a capacitor 180. The other end of the capacitor 180 is grounded. An ineffective signal is applied to the switch SW12 via the capacitor 180. The switch SW12 receives the output signal of the chrominance signal processing circuit 129. The switch SW12 selects one of the ineffective signal and the output signal of the chrominance signal processing circuit 129, and transmits the selected signal to the adder 130. The adder 130 combines the final reproduced luminance signal from the noise canceller 128 and the signal from the switch SW12 into a reproduced composite video signal. The adder 130 outputs the reproduced composite video signal. The adder 130 is connected to a connection point "H" provided between the VHS signal reproducing circuit 103 and the S-VHS signal reproducing circuit 104. The switch SW13 is connected among the adder 130, a connection point "J", and an output terminal OutV. The connection point "J" is provided between the VHS signal reproducing circuit 103 and the S-VHS signal reproducing circuit 104. In the presence of the S-VHS signal reproducing circuit 104, the switch SW13 receives a composite video signal therefrom via the connection point "J". The switch SW13 receives the composite video signal from the adder 130. The switch SW13 selects one of the composite video signal from the S-VHS signal reproducing circuit 104 and the composite video signal from the adder 130, and transmits the selected composite video signal to the output terminal OutV as a final composite video signal. The final composite video signal OutV can be transmitted to an external apparatus via the output terminal OutV.

In the absence of the S-VHS signal reproducing circuit 104, the switch SW9 is fixed to a position at which the double limiter 122 is connected to the FM equalizer 121, and the switch SW10 is fixed to a position at which the switch SW1 is connected to the nonlinear emphasis circuit 126. In addition, the switch SW11 is fixed to a position at which the luminance noise reduction circuit 127 is connected to the switch SW10, and the switch SW12 is fixed to a position at which the adder 130 is connected to the chrominance signal processing circuit 129. Furthermore, the switch SW13 is fixed to a position at which the output terminal OutV is connected to the adder 130.

In the absence of the S-VHS signal reproducing circuit 104, the signal reproduced from the magnetic tape is successively processed by the reproducing amplifier 120, the FM equalizer 121, the double limiter 122, the FM demodulation circuit 123, the main de-emphasis circuit 124, the low pass filter 125, the nonlinear de-emphasis circuit 126, the luminance noise reduction circuit 127, and the noise canceller 128. Thereby, the reproduced signal is demodulated and converted into the reproduced luminance signal which is applied to the adder 130 from the noise canceller 128. Also, the reproduced signal is successively processed by the reproducing amplifier 120 and the chrominance signal processing circuit 129, being demodulated and converted into the reproduced chrominance signals. The reproduced chrominance signals are applied to the adder 130 from the chrominance signal processing circuit 129. The adder 130 combines the reproduced luminance signal and the reproduced chrominance signals into a reproduced composite video signal. The reproduced composite video signal travels from the adder 130 to the output terminal OutV via the switch SW13. The reproduced composite video signal can be transmitted to an external apparatus via the output terminal OutV.

The combination of the VHS signal reproducing circuit 103 and the S-VHS signal reproducing circuit 104 is able to implement the processing of an S-VHS video signal in addition to the processing of a VHS video signal.

As shown in FIG. 12, the S-VHS signal reproducing circuit 104 includes an FM equalizer 155, a low pass filter (LPF) 156, a sub de-emphasis circuit 157, a switch SW14, a comb filter 158, and an adder 159. The FM equalizer 155 is connected between the connection points "D" and "E". The low pass filter 156 is connected to the connection point "F". The sub de-emphasis circuit 157 is connected to the low pass filter 156. The switch SW14 is connected among the connection points "F" and "G", and the sub de-emphasis circuit 157. The comb filter 158 is connected to the connection point "H". The comb filter 158 is connected to the adder 159 and an output terminal OutY. The adder 159 is connected to the connection points "I" and "J". The connection point "I" is connected to an output terminal OutC.

The FM equalizer 155 in the S-VHS signal reproducing circuit 104 receives the output signal of the reproducing amplifier 120 in the VHS signal reproducing circuit 103 via the connection point "D". The FM equalizer 155 subjects the output signal of the reproducing amplifier 120 to an equalization process designed to compensate for the group delay characteristic and the frequency response of a tape-head signal transmission arrangement including the magnetic tape and the magnetic heads with respect to an S-VHS video signal. The FM equalizer 155 outputs the resultant signal to the switch SW9 in the VHS signal reproducing circuit 103 via the connection point "E".

The low pass filter 156 in the S-VHS signal reproducing circuit 104 receives the signal from the switch S10 in the VHS signal reproducing circuit 103 via the connection point "F". The low pass filter 156 removes a carrier from the received signal. The low pass filter 156 outputs the resultant signal to the sub de-emphasis circuit 157. The sub de-emphasis circuit 157 de-emphasizes high-frequency components of the output signal of the low pass filter 156 to further improve the S/N ratio in luminance. Operation of the sub de-emphasis circuit 157 is inverse with respect to the sub emphasis circuit 153 in the recording side of the apparatus. The sub de-emphasis circuit 157 outputs the resultant signal. The switch SW14 receives the output signal of the sub de-emphasis circuit 157. The switch SW14 receives the signal from the switch SW10 in the VHS signal reproducing circuit 103 via the connection point "F". The switch SW14 selects one of the output signal of the sub de-emphasis circuit 157 and the signal fed via the switch SW10, and transmits the selected signal to the switch SW11 in the VHS signal reproducing circuit 103 via the connection point The comb filter 158 in the S-VHS signal reproducing circuit 104 receives the output signal of the adder 130 in the VHS signal reproducing circuit 103 via the connection point "H". The comb filter 158 removes chrominance components from the output signal of the adder 130 to derive a high-purity reproduced luminance signal. The comb filter 158 applies the reproduced luminance signal to t he adder 159 and the output terminal OutY. The reproduced luminance signal can be transmitted to an external apparatus via the output terminal OutY. The adder 159 receives the reproduced color signal composed of the reproduced chrominance signals, that is, the output signal of the chrominance signal processing circuit 129 in the VHS signal reproducing circuit 103 via the connection point "I". The adder 159 combines the reproduced luminance signal and the reproduced color signal into a reproduced composite video signal. The reproduced composite video signal is transmitted from the adder 159 to the switch SW13 in the VHS signal reproducing circuit 103 via the connection point "J". The reproduced color signal composed of the reproduced chrominance signals, that is, the output signal of the chrominance signal processing circuit 129 in the VHS signal reproducing circuit 103, travels to the output terminal OutC via the connection point "I". The reproduced color signal can be transmitted to an external apparatus via the output terminal OutC.

In the presence of the S-VHS signal reproducing circuit 104, the reproducing side of the apparatus is able to implement the processing of a VHS video signal and also the processing of an S-VHS video signal. The reproducing side of the apparatus can output the composite video signal via the output terminal OutV, and also output the component video signals (that is, the luminance signal and the color signal) via the output terminals OutY and OutC.

In the presence of the S-VHS signal reproducing circuit 104, the reproducing side of the apparatus operates in a mode which can be changed between a VHS mode and an S-VHS mode.

During the VHS mode of operation, the switch SW9 is fixed to a position at which the double limiter 122 is connected to the FM equalizer 121, and the switch SW10 is fixed to a position at which the nonlinear de-emphasis circuit 126 is connected to the connection point "F". In addition, the switch SW11 is fixed to a position at which the luminance noise reduction circuit 127 is connected to the connection point "G", and the switch SW12 is fixed to a position at which the adder 130 is connected to the capacitor 180. Furthermore, the switch SW13 is fixed to a position at which the output terminal OutV is connected to the connection point "J", and the switch SW14 is fixed to a position at which the connection point "G" is connected to the connection point "F".

During the VHS mode of operation, the signal reproduced from the magnetic tape is successively processed by the reproducing amplifier 120, the FM equalizer 121, the double limiter 122, the FM demodulation circuit 123, the main de-emphasis circuit 124, the low pass filter 125, the nonlinear de-emphasis circuit 126, the luminance noise reduction circuit 127, and the noise canceller 128. Thereby, the reproduced signal is demodulated and converted into the reproduced luminance signal which is applied to the adder 130 from the noise canceller 128. Since the ineffective signal is applied to the adder 130 via the capacitor 180 and the switch SW12, the luminance signal passes through the adder 130 without being processed. Then, the luminance signal travels to the comb filter 158 via the connection point "H". The luminance signal is processed by the comb filter 158. The resultant luminance signal is fed to the adder 159 and the output terminal OutY from the comb filter 158. The luminance signal can be transmitted to an external apparatus via the output terminal OutY. Also, the reproduced signal is successively processed by the reproducing amplifier 120 and the chrominance signal processing circuit 129, being demodulated and converted into the reproduced color signal. The reproduced color signal travels from the chrominance signal processing circuit 129 to the adder 159 and the output terminal OutC via the connection point "I". The color signal can be transmitted to an external apparatus via the output terminal OutC. The color signal and the luminance signal are combined by the adder 159 into the composite video signal. The composite video signal travels from the adder 159 to the output terminal OutV via the connection point "J" and the switch SW13. The composite video signal can be transmitted to an external apparatus via the output terminal OutV. The comb filter 158 prevents every picture represented by the composite video signal from being contaminated by moire.

During the S-VHS mode of operation, the switch SW9 is fixed to a position at which the double limiter 122 is connected to the connection point "E", and the switch SW10 is fixed to a position at which the main de-emphasis circuit 124 is connected to the connection point "F". In addition, the switch SW11 is fixed to the position at which the luminance noise reduction circuit 127 is connected to the connection point "G", and the switch SW12 is fixed to the position at which the adder 130 is connected to the capacitor 180. Furthermore, the switch SW13 is fixed to the position at which the output terminal OutV is connected to the connection point "J", and the switch SW14 is fixed to a position at which the connection point "G" is connected to the sub de-emphasis circuit 157.

During the S-VHS mode of operation, the signal reproduced from the magnetic tape is successively processed by the reproducing amplifier 120, the FM equalizer 155, the double limiter 122, the FM demodulation circuit 123, the main de-emphasis circuit 124, the low pass filter 156, the sub de-emphasis circuit 157, the luminance noise reduction circuit 127, and the noise canceller 128. Thereby, the reproduced signal is demodulated and converted into the reproduced luminance signal which is applied to the adder 130 from the noise canceller 128. Since the ineffective signal is applied to the adder 130 via the capacitor 180 and the switch SWI2, the luminance signal passes through the adder 130 without being processed. Then, the luminance signal travels to the comb filter 158 via the connection point "H". The luminance signal is processed by the comb filter 158. The resultant luminance signal is fed to the adder 159 and the output terminal OutY from the comb filter 158. The luminance signal can be transmitted to an external apparatus via the output terminal OutY. Also, the reproduced signal is successively processed by the reproducing amplifier 120 and the chrominance signal processing circuit 129, being demodulated and converted into the reproduced color signal. The reproduced color signal travels from the chrominance signal processing circuit 129 to the adder 159 and the output terminal OutC via the connection point "I". The color signal can be transmitted to an external apparatus via the output terminal OutC. The color signal and the luminance signal are combined by the adder 159 into the composite video signal. The composite video signal travels from the adder 159 to the output terminal OutV via the connection point "J" and the switch SW13. The composite video signal can be transmitted to an external apparatus via the output terminal OutV. The comb filter 158 prevents every picture represented by the composite video signal from being contaminated by moire.

It should be noted that the recording side may be omitted from the magnetic recording and reproducing apparatus in the second embodiment of this invention.

What is claimed is:

1. A magnetic recording and reproducing apparatus comprising first means for recording a video signal of a first standard format, which has a first luminance frequency band, on a magnetic tape of a first standard type designed to record a video signal of the first standard format during a standard operation mode; second means for recording a video signal of a second standard format, which has a second luminance frequency band wider than the first luminance frequency band, on a magnetic tape of a second standard type designed to record a video signal of the second standard format during a true high-quality operation mode; third means for recording a video signal of a high-quality format, which has a third luminance frequency band equal to the second luminance frequency band, on a magnetic tape of the first standard type during a quasi high-quality operation mode; fourth means for reproducing a video signal of the first standard format which has been recorded in the standard operation mode from a magnetic tape of the first standard type; fifth means for reproducing a video signal of the second standard format which has been recorded in the high-quality operation mode from a magnetic tape of the second standard type; and sixth means for reproducing a video signal of the high-quality format which has been recorded in the quasi high-quality operation mode from a magnetic tape of the first standard type; the magnetic recording and reproducing apparatus further comprising:

a preemphasis circuit for emphasizing high-frequency components of a first luminance signal in an input video signal to generate a second luminance signal;

an FM modulation circuit for modulating a frequency of a carrier in accordance with the second luminance signal to generate a third luminance signal being an FM modulation luminance signal;

an adder for multiplexing the FM modulation luminance signal and a chrominance signal in the input video signal into a record signal on a frequency multiplexing basis;

a recording circuit for recording the record signal on a recording tape;

a reproducing circuit for reproducing a record signal from a recording tape to generate a reproduced signal;

an FM demodulation circuit for demodulating an FM modulation luminance signal being a fourth luminance signal in the reproduced signal to generate a fifth luminance signal; and a de-emphasis circuit for de-emphasizing high-frequency components of the fifth luminance signal to generate a sixth luminance signal;

wherein a degree of emphasizing by the preemphasis circuit during the quasi high-quality operation mode is lower, by an emphasis difference quantity, than that during the standard operation mode and the true high-quality operation mode concerning signal components having frequencies of at least 1 MHz or higher, and the emphasis difference quantity increases as a signal frequency rises, and wherein a frequency deviation provided by the FM modulation circuit during the quasi high-quality operation mode is greater than that during the standard operation mode and is equal to that during the true high-quality operation mode.

2. A magnetic recording and reproducing apparatus as recited in claim 1, wherein the frequency deviation provided by the FM modulation circuit during the quasi high-quality operation mode is of 5.4 MHz to 7.0 MHz.

3. A magnetic recording and reproducing apparatus as recited in claim 1, further comprising a white clip circuit provided between the preemphasis circuit and the FM modulation circuit for adjusting a white clip level of the second luminance signal, and wherein the white clip level during the quasi high-quality operation mode is lower than that during the true high-quality operation mode.

4. A magnetic recording and reproducing apparatus as recited in claim 1, further comprising a white clip circuit connected between the preemphasis circuit and the FM modulation circuit for adjusting a white clip level of the second luminance signal, wherein the white clip level during the quasi high-quality operation mode is lower than that during the true high-quality operation mode, and wherein the frequency deviation provided by the FM modulation circuit during the quasi high-quality operation mode is of 5.4 MHz to 7.0 MHz.

5. A magnetic recording and reproducing apparatus as recited in claim 1, further comprising a frequency deviation detector for detecting a frequency deviation of an FM modulation luminance signal in the reproduced signal generated by the reproducing circuit, and an identification hole detector for detecting an identification hole present in a housing containing a magnetic tape of the second standard type and absent from a housing containing a magnetic tape of the first standard type.

6. A magnetic recording and reproducing apparatus as recited in claim 5, wherein the quasi high-quality operation mode is implemented in cases where the frequency deviation detected by the frequency deviation detector corresponds to either the second standard format or the high-quality format and an identification hole is not detected by the identification hole detector.

7. A magnetic recording and reproducing ng apparatus as recited in claim 5, further comprising a reproducing FM equalizer provided between the reproducing circuit and the FM demodulation circuit for compensating a frequency condition and a group delay condition of the reproduced signal with respect to the recording circuit and the reproducing circuit, a noise canceler for removing high-frequency noises from the sixth luminance signal, and a controller for controlling a characteristic of at least one of the de-emphasis circuit, the reproducing FM equalizer, and the noise canceler in response to a result of the detection by the frequency deviation detector and a result of the detection by the identification hole detect or.

8. A magnetic recording and reproducing apparatus as recited in claim 1, further comprising a noise canceler for removing high-frequeny noises from the sixth luminance signal, and wherein a degree of noise cancel by the noise canceler during the reproduction of the video signal of the high-quality format is greater than that during the reproduction of the video signal of the second standard format.

9. A video signal processing circuit board comprising:

an input terminal subjected to either an input video signal of a standard format or an input video signal of a high-quality format, wherein the input video signal of the high-quality format is higher in picture quality than the input video signal of the standard format and is wider in frequency ban d than the input video signal of the standard format;

first and second connection terminals for disconnectable connection with an external processor;

a video signal processing circuit; and a switching means for changing a switching operation between a first state and a second state, wherein the switching means connects the input terminal to the video signal processing circuit, disconnects the input terminal from the first connection terminal, and disconnects the video signal processing circuit from the second connection terminal when being in the first state, and wherein the switching means disconnects the input terminal from the video signal processing circuit, connects the input terminal to the first connection terminal, and connects the video signal processing circuit to the second connection terminal when being in the second state;

wherein when the switching means is in the first state, the video signal processing circuit receives an input video signal of the standard format from the input terminal via the switch and processes the input video signal of the standard format into a record signal, and wherein when the switch is in the second state, an input video signal of the high-quality format is transmitted from the input terminal to the first connection terminal and the video signal processing circuit receives a video signal of the high-quality format from the second connection terminal via the switching means and processes the video signal of the high-quality format into a record signal.

\* \* \* \* \*